US011271755B2

(12) United States Patent
Mondello et al.

(10) Patent No.: US 11,271,755 B2
(45) Date of Patent: Mar. 8, 2022

(54) VERIFYING VEHICULAR IDENTITY

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 294 days.

(21) Appl. No.: 16/362,954

(22) Filed: Mar. 25, 2019

(65) Prior Publication Data

US 2020/0313907 A1 Oct. 1, 2020

(51) Int. Cl.
*H04L 29/06* (2006.01)
*H04L 9/32* (2006.01)
*H04L 9/08* (2006.01)
*H04L 9/30* (2006.01)

(52) U.S. Cl.
CPC .......... *H04L 9/3268* (2013.01); *H04L 9/0825* (2013.01); *H04L 9/0866* (2013.01); *H04L 9/30* (2013.01)

(58) Field of Classification Search
CPC ... H04L 9/3268; H04L 9/0866; H04L 9/0825; H04L 9/30; H04L 63/0823; H04L 9/3263; H04L 9/0861; H04L 9/3247; H04L 2209/84
See application file for complete search history.

(56) References Cited

U.S. PATENT DOCUMENTS

| 2014/0075186 A1* | 3/2014 | Austen ................ H04L 63/0823 713/156 |
| 2016/0210858 A1* | 7/2016 | Foster .................. G08G 1/0965 |
| 2018/0040246 A1* | 2/2018 | Yonemura .............. G08G 1/161 |
| 2018/0232819 A1* | 8/2018 | Stocker ................. G06Q 50/06 |
| 2018/0272886 A1* | 9/2018 | Stocker ................. B60L 53/665 |
| 2018/0274943 A1* | 9/2018 | Stocker ................. G06Q 20/223 |
| 2019/0053051 A1* | 2/2019 | Yu ......................... H04L 9/0825 |

(Continued)

FOREIGN PATENT DOCUMENTS

| CN | 111163453 A | * | 5/2020 | |
| EP | 2571328 A1 | * | 3/2013 | ............. G08G 1/093 |

(Continued)

OTHER PUBLICATIONS

International Search Report and Written Opinion from related International Application No. PCT/US2020/021630, dated Jul. 2, 2020, 13 pages.

(Continued)

*Primary Examiner* — Hee K Song
*Assistant Examiner* — Hassan A Hussein
(74) *Attorney, Agent, or Firm* — Brooks, Cameron & Huebsch, PLLC

(57) ABSTRACT

The present disclosure includes apparatuses, methods, and systems for verifying a vehicular identity. An example includes a processing resource, memory, and a vehicular communication component configured to verify an identity of the particular vehicle using a public key, wherein the public key is received in response to a departure of the particular vehicle, and request, in response to verifying the identity of the particular vehicle, data corresponding to information associated with the departure of the particular vehicle.

25 Claims, 16 Drawing Sheets

(56) References Cited

U.S. PATENT DOCUMENTS

| | | | |
|---|---|---|---|
| 2019/0141048 A1* | 5/2019 | Fallah | H04L 9/0637 |
| 2019/0190987 A1* | 6/2019 | Waffner | H04L 67/104 |
| 2019/0215404 A1* | 7/2019 | Stocker | B60L 53/68 |
| 2019/0238343 A1* | 8/2019 | Racklyeft | H04L 9/3263 |
| 2019/0268277 A1* | 8/2019 | Asthana | H04L 67/10 |
| 2019/0278899 A1* | 9/2019 | Chen | H04L 63/0442 |
| 2019/0325125 A1* | 10/2019 | Pantfoerder | H04L 63/0823 |
| 2019/0373137 A1* | 12/2019 | Krukar | G06F 3/1222 |
| 2020/0008027 A1* | 1/2020 | Yabuuchi | G08G 1/09 |
| 2020/0021981 A1* | 1/2020 | Mondello | H04W 4/80 |
| 2020/0145191 A1* | 5/2020 | Qi | H04L 9/3247 |
| 2020/0153636 A1* | 5/2020 | Takada | H04L 9/3073 |
| 2020/0312136 A1* | 10/2020 | Mondello | H04W 12/069 |
| 2020/0313909 A1* | 10/2020 | Mondello | H04L 9/3268 |
| 2021/0073811 A1* | 3/2021 | Chan | H04L 9/32 |
| 2021/0075408 A1* | 3/2021 | Noguchi | G11C 11/40618 |
| 2021/0075600 A1* | 3/2021 | Trevethan | G06Q 20/065 |

FOREIGN PATENT DOCUMENTS

| | | | | |
|---|---|---|---|---|
| EP | 2571328 A1 | | 3/2013 | |
| EP | 3393100 A1 | * | 10/2018 | H04W 12/10 |
| EP | 3393100 A1 | | 10/2018 | |
| JP | 2011215712 A | * | 10/2011 | |
| KR | 20190102409 A | * | 9/2019 | |
| KR | 20190130114 A | * | 11/2019 | B41J 29/02 |
| KR | 20200110740 A | * | 9/2020 | H01M 50/40 |
| WO | 2019-027889 A1 | | 2/2019 | |
| WO | WO-2019027889 A1 | * | 2/2019 | G01M 17/00 |

OTHER PUBLICATIONS

U.S. Appl. No. 15/853,498, entitled, "Physical Unclonable Function Using Message Authentication Code", filed Dec. 22, 2017, 28 pages.

U.S. Appl. No. 16/201,652, entitled, "Parking Infrastructure Powered by a Decentralized, Distributed Database", filed Nov. 27, 2018, 27 pages.

U.S. Appl. No. 15/993,119, entitled, "Transmission of Vehicle Route Information by Passive Devices", filed May 30, 2018, 25 pages.

U.S. Appl. No. 16/034,763, entitled, "Secure Vehicular Communication", filed Jul. 13, 2018, 37 pages.

U.S. Appl. No. 16/034,809, entitled, "Secure Vehicular Services Communication", filed Jul. 13, 2018, 36 pages.

PCT International Application No. PCT/IB2019/000089, entitled, "Method for Improving Safety of a Component or System Running a Firmware or a Finite State Machine", filed Feb. 22, 2019, 42 pages.

* cited by examiner

LEGEND

219 ANTENNA
349 ANTENNA

VERIFYING VEHICULAR IDENTITY

TECHNICAL FIELD

The present disclosure relates generally to apparatuses and methods, and more particularly, to verifying a vehicular identity.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded Multi Media Card (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

DETAILED DESCRIPTION

Figure 1:
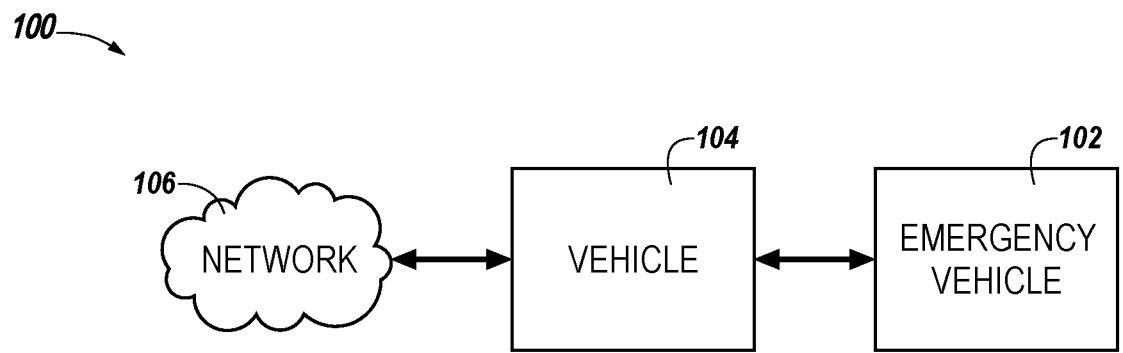
FIG. 1 illustrates a diagram of a system including a vehicle capable of communicating with an emergency vehicle and a network for verifying an identity of the emergency vehicle in accordance with an embodiment of the present disclosure.

The present disclosure includes apparatuses, methods, and systems for verifying a vehicular identity. An embodiment includes a processing resource, memory, and a vehicular communication component configured to verify an identity of the particular vehicle using a public key, wherein the public key is received in response to a departure of the particular vehicle, and request, in response to verifying the identity of the particular vehicle, data corresponding to information associated with the departure of the particular vehicle.

Emergency entities (e.g., vehicle) such as ambulances, police cars, and/or firefighting cars have previously communicated with other vehicles using flashing lights, sirens, etc. However, using flashing lights and/or sirens to communicate with other vehicles are limited in that no further information (e.g., destination of an emergency vehicle) are communicated to the other vehicles. Embodiments of the present disclosure provides a mechanism of not only communicating those information to vehicles other than an emergency vehicle, but also providing a security to the communication. For example, the communication between the emergency vehicle and the vehicular vehicles (e.g., and/or an additional emergency vehicles) may be intercepted and/or manipulated by a hacker or other entities in order to change the communication, repeat the communication to gain unauthorized access to the emergency vehicle or other vehicles, etc. In such instances, the emergency vehicle may not provide an ability to verify its identity to insure to the recipient of the communication that the emergency vehicle is authorized to provide such communication (e.g., to pull over, to stop the vehicle, to reduce a speed of the vehicle, to clear or exit a roadway, to park as soon as possible, to assist others on the road in an emergency, etc.). Absent an ability to verify the identity of the emergency vehicle, the communication may be unauthorized and may negatively affect the other vehicles or request the vehicular vehicle to perform actions that the emergency vehicle does not have authorization to request.

Accordingly, embodiments of the present disclosure provides benefits such as making sure that requests made to other vehicles are from an authorized emergency vehicle. The embodiments of the present disclosure, therefore, result in secure communication and an increase in compliance by other vehicle's as verification of the identity of the emergency entity can indicate the emergency entity has proper authority to request such compliance.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 204 may reference element "04" in FIG. 2, and a similar element may be referenced as 304 in FIG. 3.

FIG. 1 illustrates a diagram of a system 100 including a vehicle 104 capable of communicating with an emergency vehicle 102 and a network 106 for verifying an identity of the emergency vehicle 102 in accordance with an embodiment of the present disclosure. The vehicle 104 can be an autonomous vehicle, a traditional non-autonomous vehicle, a service vehicle, or the like, and that can be referred to as an apparatus. (e.g., vehicle that is not an emergency vehicle and/or an emergency vehicle that is not in service). The emergency vehicle 102 can be various types of emergency vehicles such as police cars, firefighting cars, and/or ambulances that can dispatch (e.g., initiate a departure) to a destination for various emergencies. It is noted that while two vehicles (e.g., one vehicle and one emergency vehicle) are shown in FIG. 1, embodiments of the present disclosure do not limit systems to a particular quantity of vehicles.

The network 106 can support a distributed ledger technology (DLT) such as "block chain" technology. A distributed ledger is a database that is spread over several nodes or computing devices. A "block chain" is a continuously growing encrypted list of records. Block chain is one form a DLT in which multiple nodes (nodes 408 and/or 410 as described in connection with FIG. 4) can share and store the distributed list of records in a peer to peer network manner. As described herein a "block" in block chain is collection of information, e.g., data, headers, transactions, encryption, etc. A block may be added to the growing list of records in the ledger if it is validated. Blocks are added to the block chain ledger in chronological order.

The network 106 can be a database storing those data associated with vehicles registered to an area associated with the network 106. As used herein, an area can refer to a settlement or locality. For example, an area can encompass a portion or an entirety of a city, a town, a municipality, a township, a zip code, a borough, a village, or a hamlet. In some embodiments, an area can be geographically defined and can be bounded by particular coordinates (e.g., latitude and longitude) and/or geographic features (e.g., roads, rivers, etc.). Accordingly, vehicles (e.g., emergency vehicle 102 and/or vehicle 104) can access network 106 for data having information associated with vehicles registered to the area associated with the network 106. In some examples, the vehicles may access other network and/or database associated with a different area for, for example, data having information associated with vehicles registered to the different area.

A presence of the emergency vehicle 102 can be, while the emergency vehicle 102 is on its dispatch, detected (e.g., determined) in various ways. In one example, a dispatch of the emergency vehicle 102 may be detected by a detecting/communicating device distributed over a particular area. As an example, the emergency vehicle 102 may be visually detected by a monitoring device (e.g., surveillance camera) implemented in one or more traffic control devices. In this example, a particular traffic control device that has detected the dispatch of the emergency vehicle 102 can communicate (e.g., propagate) the dispatch to other nodes of a network (e.g., network 106), such as other traffic control devices. As an example, the emergency vehicle 102 can, as it initiates its dispatch, provide a notice to a control node such that the control node can propagate the received notice to traffic control devices within the network. As used herein, a "traffic control device" refers to a device configured to inform, guide, and/or control traffic. Example traffic control devices include, but are not limited to: traffic signs, arrow boards, warning signs, variable message signs, and traffic lights. The detected dispatch can be ultimately communicated to the vehicle 104 along with other data for verifying an identity of the emergency vehicle 102.

In another example, the dispatch of the emergency vehicle 102 can be detected directly by the vehicle 104. As an example, the emergency vehicle 102 can, while heading to a destination, broadcast its presence such that, when vehicle 104 is within a particular proximity to emergency vehicle 102, the emergency vehicle 102 can be detected by the vehicle 104. Further details of verifying an identity of vehicles (e.g., emergency vehicles) are described in connection with FIG. 7.

Upon emergency vehicle 102 being detected, data corresponding to particular information can be communicated to vehicle 104, and the vehicle 104 can verify an identity of the emergency vehicle 102 based on the received information. The information can include, as described herein, a public key, a public identification, and/or a certificate generated at the emergency vehicle 102. In an example where the emergency vehicle 102 is directly detected by the vehicle 104, the information may be provided from the emergency vehicle directly.

In another example where the emergency vehicle 102 is detected by an entity other than the vehicle 104, the information may be retrieved, as an example, from and provided (e.g., to the vehicle 104) via the network 106. The information may be retrieved via an intermediary device such as a query device. As used herein, a query device may be referred to as a programmable silicon device that is capable of performing high-speed symbolic pattern matching, which allows comprehensive search and analysis of complex and/or unstructured database (e.g., network 106).

Upon verifying an identity of the emergency vehicle 102, various information associated with a dispatch of the emergency vehicle 102 can be communicated to the vehicle 102 either directly and/or indirectly. As an example, a route to a destination of the emergency vehicle 102 can be provided to vehicle 104, as described herein in further details.

The data exchanged among emergency vehicle 102, vehicle 104, and/or network 106 can be performed using a number of encryption and/or decryption methods as described below. The securing of the data can insure that nefarious activity is prevented from interfering with the emergency and/or vehicle data provided to the vehicular entity and/or the emergency entity.

Figure 2:
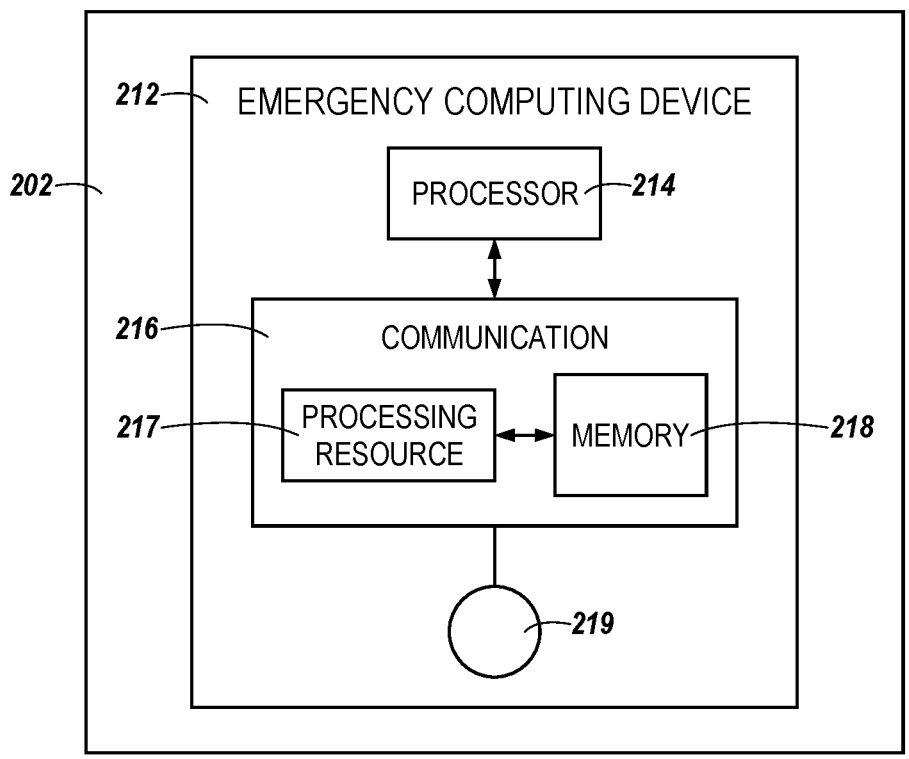
FIG. 2 is a block diagram of an example emergency vehicle in accordance with an embodiment of the present disclosure.

FIG. 2 is a block diagram of an example emergency vehicle 202, in accordance with an embodiment of the present disclosure. The emergency vehicle 202 can be analogous to emergency vehicle 102 as described in connection with FIG. 1.

The emergency vehicle 202 can include an emergency computing device 212, such as an on-board computer. As shown in FIG. 2, the emergency computing device 212 can include a processor 214 coupled to an emergency communication component 216, such as a reader, writer, transceiver, and/or other computing device or circuitry capable of performing the functions described below to exchange information, that is coupled to (e.g., or includes) an antenna 219. The emergency communication component 216 can include logic and/or circuitry that is used to perform the actions recited below (e.g., encrypt/decrypt, execute instructions, etc.). Emergency communication component 216 can include a processing resource 217 coupled to a memory 218, such as a non-volatile flash memory, although embodiments are not so limited. The emergency computing device 212 can be coupled to or within an emergency vehicle 202 such as an ambulance, a police vehicle, a fire truck, etc.

Emergency communication component 216 can transmit, broadcast, and/or provide data to various entities such as computing devices (e.g., vehicle 304 and/or traffic control devices 410 described in connection with FIGS. 3 and 4, respectively) and/or network 406 shown in FIG. 4. Similarly, emergency communication component 216 can receive traffic, road, and/or additional data from other computing devices, such as a vehicle 304 and/or traffic control device 410 described in association with FIG. 3 and FIG. 4, respectively, or an additional electronic sign, electronic and/or digitized roadway, etc. As an example, a roadway and/or sign can be coupled to, or have embedded within the roadway and/or sign, a communication component (similar to emergency communication component 216) that can communicate data associated with road/sign conditions, road/sign status, etc.

Figure 3:
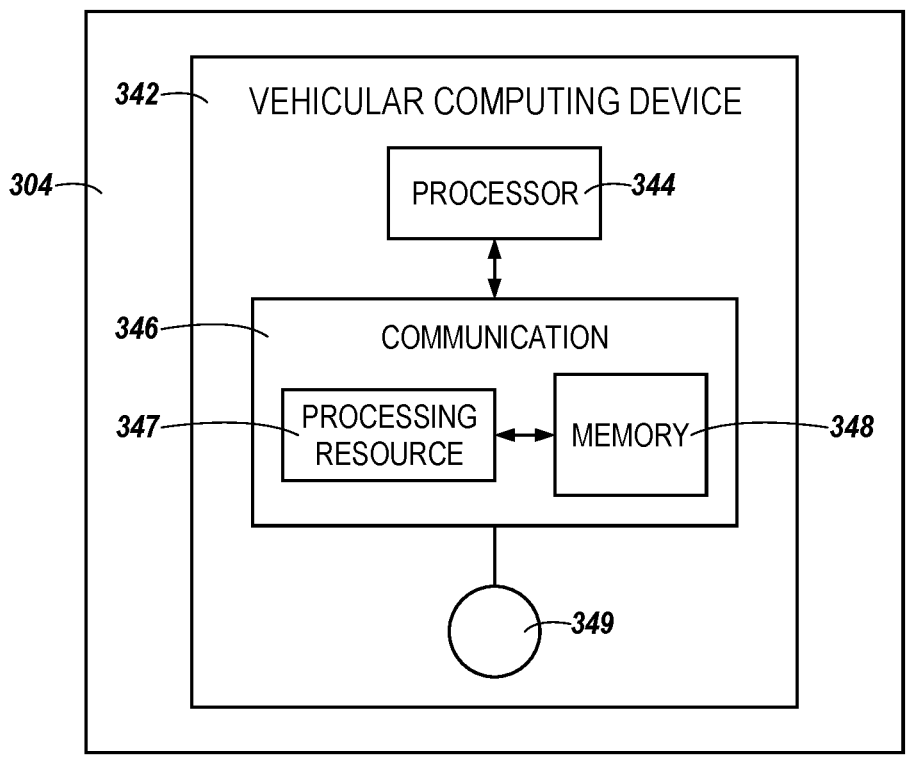
FIG. 3 is a block diagram of an example vehicle in accordance with an embodiment of the present disclosure.

FIG. 3 is a block diagram of an example vehicle 304 in accordance with an embodiment of the present disclosure. The vehicle 304 can be analogous to vehicle 104 as described in connection with FIG. 1. The vehicle 304 can be coupled to a vehicular computing device 342. The vehicular computing device 342 can use various communication methods, such as wireless communication, to communicate with the emergency computing device 212. In the example of FIG. 3, the vehicular computing device 342 can include a processor 344 to execute instructions and control functions of the vehicular computing device 342. The processor 344 may be coupled to a vehicular communication component 346, such as a reader, writer, transceiver, and/or other computing device or circuitry capable of performing the functions described below to exchange information, that is coupled to (e.g., or includes) an antenna 349. Vehicular communication component 346 can include a processing resource 347 coupled to a memory 348, such as a non-volatile flash memory, although embodiments are not so limited. The antenna 349 of the vehicular computing device 342 can be in communication with, e.g., communicatively coupled to, the antenna 219 of the emergency computing device 212 shown in FIG. 2, and/or network 406 and/or traffic control devices 410 shown in FIG. 4.

In some examples, antennas 349 and 219 can be loop antennas configured as inductor coils, etc. Antenna 219 can loop around emergency computing device 212, for example. Antenna 219 can generate an electromagnetic field in response to current flowing through antenna 219. For example, the strength of the electromagnetic field can depend on the number of coils and the amount of current. The electromagnetic field generated by antenna 219 can induce current flow in an antenna 349 that powers the respective vehicular computing device 342. As an example, antenna 219 in FIG. 1 can induce current flow in antenna 349 when the vehicular computing device 342 is brought within a communication distance (e.g., a communication range) of the antenna 219. For example, the communication distance can depend on the strength of the electromagnetic field generated by antenna 219. The electromagnetic field generated by antenna 219 can be set, by the number of coils of antenna 219 and/or the current passing through antenna 219, such that the communication distance can span from the location of the emergency computing device 212 to the vehicular computing device 342. In some examples, the communication distance can be about 50 centimeters to about 100 centimeters on either side of the emergency computing device 212. In the alternative, the communication distance can depend on the strength of the electromagnetic field generated by antenna 349. In this instance, the electromagnetic field generated by antenna 349 can be set by the number of coils of 349 and/or the current passing through antenna 349.

In some examples, the vehicular computing device 342 can include a number of wireless communication devices, such as transmitters, transponders, transceivers, or the like. As an example, the vehicular communication component 346 can be such a wireless communication device. Wireless communication that can be used can include near field communication (NFC) tags, RFID tags, or the like. In at least one embodiment, wireless communication can be performed using non-volatile storage components that can be respectively integrated into chips, such as microchips. Each of the respective chips can be coupled to a respective antenna, such as antenna 349. The respective storage components can store respective emergency, notification, vehicle, road, and/or sign data. Further wireless communication that can be used by the vehicular communication component 346 (e.g., as well as by the emergency communication component 216) can include different generations of broadband mobile telecommunication technologies (e.g., first through fifth generation (1-5G)), device-to-device (e.g., vehicle to vehicle (v2v)) to communication including Bluetooth, Zigbee, 1-5G and/or long-term evolution (LTE) device-to-device communication technologies, and/or other wireless communication utilizing an additional device (e.g., WiFi utilizing an access point AP) may be utilized in communicating with different entities.

Emergency data can be transmitted from the emergency communication component 216 of the emergency computing device 212 to the vehicular communication component 346 of the vehicular computing device 342 in response to the emergency computing device 212 passing within the communication distance of the respective vehicular computing device 342. The emergency and/or notification data can be transmitted in the form of signals, such as radio frequency signals. For example, the emergency communication component 216 of the emergency computing device 212 and the vehicular communication component 346 of the vehicular computing device 342 can communicate using radio frequency signals.

For examples in which wireless communication devices are NFC tags, emergency communication component 216 of the emergency computing device 212 can be an NFC reader and can communicate with wireless communication devices using an NFC protocol that can be stored in memory 218 for processing by processing resource 217. In one example, the emergency communication component 216 and wireless communication devices, such as vehicular communication component 346, can communicate at about 13.56 megaHertz according to the ISO/IEC 18000-3 international standard for passive RFID for air interface communications. For example, the information can be transmitted in the form of a signal having a frequency of about 13.56 mega-Hertz.

In some examples, the emergency computing device 212 and/or the vehicular computing device 342 can use a passive wireless communication device, such as a short-range communication device (e.g., an NFC tag) that can be as described previously. The NFC tag can include a chip having a non-volatile storage component that stores information, such as emergency information, identity information, emergency device or apparatus information, and/or information about an emergency, a roadway, other vehicles, such as the location, quantity, etc. of other vehicles. Further, the NFC tag can include an antenna.

The emergency communication component 216 can receive information from the NFC tag and/or can transmit information to the NFC tag. In some examples, a communications device can include a reader (e.g., an NFC reader), such as an emergency device reader.

The memory 218 of the emergency communications component 216 can include instructions that operate according to an NFC protocol that allows emergency communications component 216 to communicate with the NFC tag. For example, the emergency communications component 216 and the NFC tag can communicate using the NFC protocol, such as at about 13.56 mega-Hertz and according to the ISO/IEC 18000-3 international standard.

The emergency communications component 216 may also communicate with an emergency operations center, such as a hospital, a fire station, a police station, etc. For example, emergency communications component 216 can be wirelessly coupled or hardwired to the emergency operations center. In some examples, emergency communications component 216 can communicate with the emergency operations center via WIFI or over the Internet. The emergency communications component 216 can energize the NFC tag when the antenna 219 associated with the NFC tag is brought within a communication distance of antenna 349, as described previously. The communication distance can be shorter and bring the devices relatively near each other and can provide better security and use less power than previous approaches that use RFID tags.

Figure 4A:
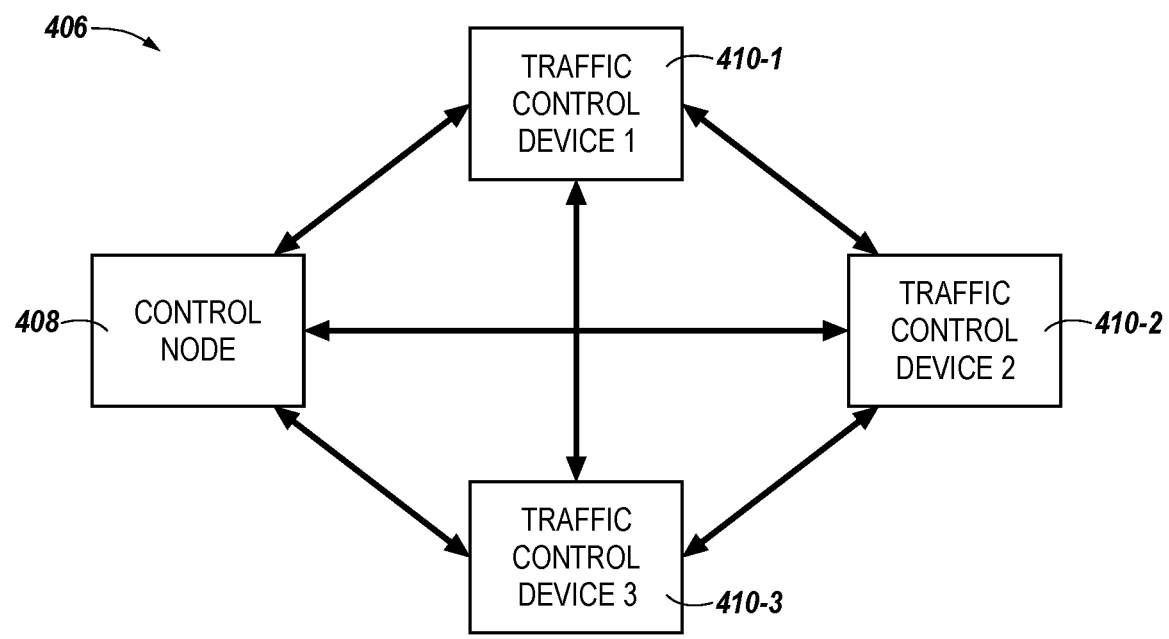
FIG. 4A is a block diagram of an example system including a plurality of traffic control devices and a control node in accordance with an embodiment of the present disclosure.
Figure 4B:
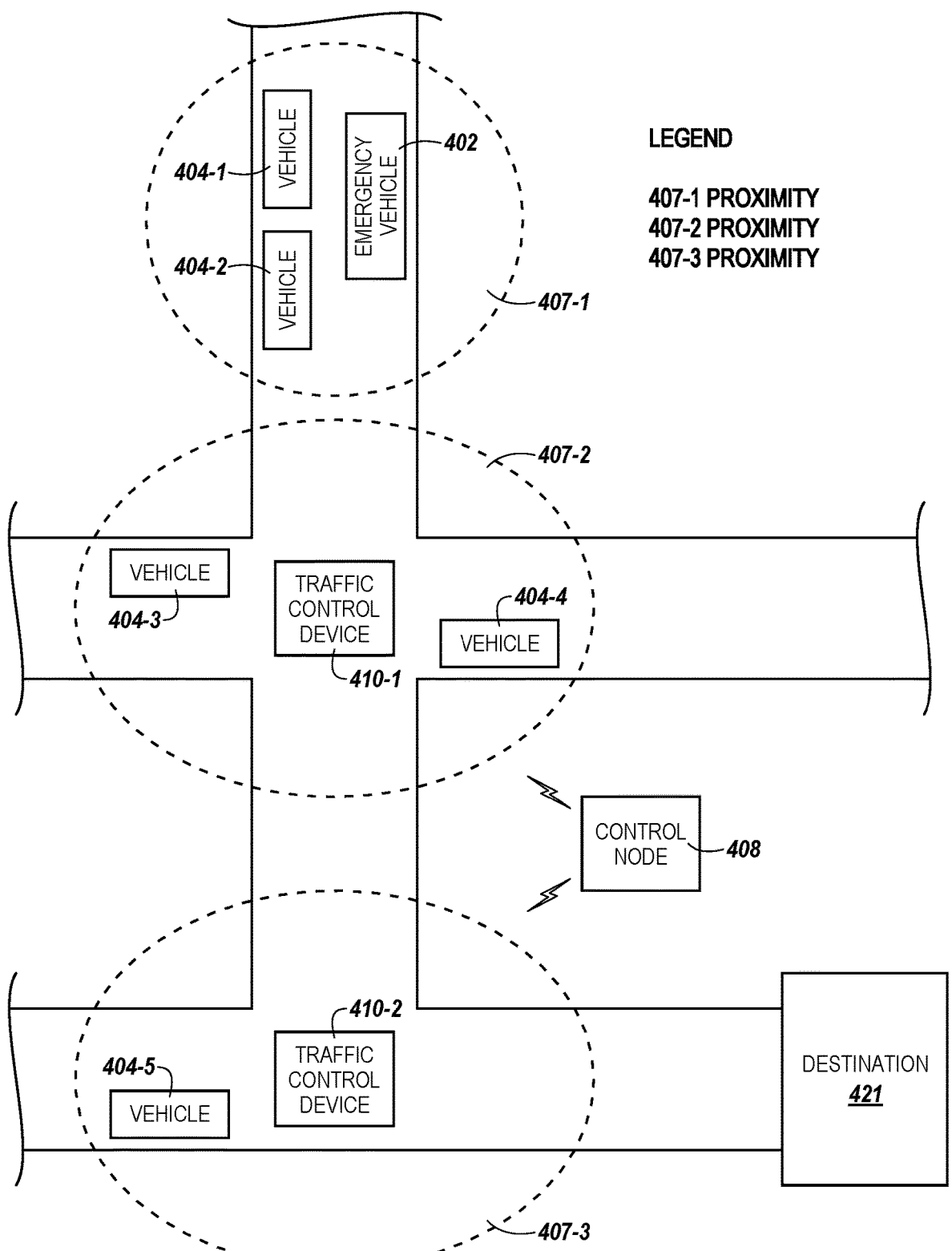
FIG. 4B illustrates a diagram of an example area, including traffic control devices, vehicles, and emergency vehicles in accordance with an embodiment of the present disclosure.

FIG. 4 is a block diagram of an example system, including a plurality of traffic control devices and a control node, in accordance with an embodiment of the present disclosure. As illustrated in FIG. 4, a system can include a plurality of traffic control devices 410-1 (traffic control device 1), 410-2 (traffic control device 2), 410-3 (traffic control device 3) (cumulatively referred to as "traffic control devices 410"). It is noted that while three traffic control devices are shown in FIG. 4, embodiments of the present disclosure do not limit systems to a particular quantity of traffic control devices. As discussed below in connection with FIG. 4B, the traffic control devices 410 can be associated with a particular area, in some embodiments.

Each of the traffic control devices 410 can operate as a node of a peer-to-peer network 406 to host a decentralized, distributed database (e.g., implemented using a block chain technique). Accordingly, the present disclosure makes alternate reference to both "traffic control devices 410" and "nodes 410." The decentralized, distributed database can be configured to store redundant copies of activity records related to traffic, such as vehicles registered to the network 406, emergency vehicles registered to the network 406, etc. For example, each respective traffic control device 410 can broadcast a traffic record in the peer to peer network 406 to cause one or more additional nodes 410 in the peer to peer network 406 to store the traffic activity record in the decentralized, distributed database having a copy of the traffic activity record maintained by each of the one or more additional nodes 410. The traffic control devices 410 can control traffic based, at least in part, on network consensus on the activity records stored in the decentralized, distributed database. For example, each node 410 in the network 406 can independently determine the validity of a record based on copies of records stored in the node 410. In some embodiments, when a majority of active nodes 410 in the network 406 approves the validity of a record, the network 406 can reach network consensus that the activity record is valid; and the validated activity record can be used to control the operations of the traffic control devices 410.

A control node 408 can be configured to monitor traffic conditions within the area, determine the presence of vehicles in the area, and/or control the overall traffic flow through the area via the traffic control devices 410. In some embodiments, the control node 408 can be associated with (e.g., located at) an emergency operations center, such as a hospital, a fire station, a police station, a dispatch center, etc. The control node 408 can be configured as the "owner" of the block chain, apprising the control node 408 of a status of the block, and allowing the control node 408 to create a backup of the network 406 and/or reconfigure the network 406. In some embodiments, the control node 408 maintains a record of vehicles that are registered to the block chain and/or the network 406. The control node 408 can be a distributed and/or local artificial intelligence in communication with the traffic control devices 410. As described further in connection with FIG. 4B, the control node 408 can be further configured to determine a route (e.g., path) of vehicles, such as emergency vehicle 102 described in connection with FIG. 1.

As described herein, the network 406 can be configured as a database storing data (e.g., corresponding to information) that can be retrieved by control node 408, traffic control devices 410, query device (e.g., as described in connection with FIG. 1), and/or vehicles, such as emergency vehicle 102 and/or vehicle 104 as described in connection with FIG. 1. The retrieved data can be communicated to a vehicle that is within, for example, a particular proximity to one of nodes of the network 406. As an example, when a particular vehicle is within a particular proximity to the traffic control device 404-1, data retrieved from the network 408 (e.g., nodes of the network 408) can be communicated to the traffic control device 404-1 such that the data can be further communicated to the particular vehicle via the traffic control device 404-1. In this example, the traffic control device is configured as intermediary device to communicate data between network 406 and vehicles.

In some examples, the network 406 may further include nodes other than control node and/or nodes corresponding to traffic control devices. As an example, some of the nodes of the network 406 can include node configured as a database for storing indexed data from those data obtained by other nodes (e.g., control node 408 and/or traffic control devices 410). As used herein, indexed data refers to data corresponding to information that are subject to a same category (e.g., transactions performed by a particular user). Often, information subject to a same category are stored over multiple blocks; therefore, retrieving the information may require reading all blocks of a block chain, which can be performed in a substantially inefficient manner in a block chain system. Having a node (e.g., or multiple nodes) configured to as database dedicated for indexed data, therefore, can reduce a necessity of reading multiple blocks to retrieve particular information, which provides benefits such as faster processing query requests for the particular information.

FIG. 4B illustrates a diagram of an example area, including traffic control devices, vehicles, and emergency vehicles in accordance with an embodiment of the present disclosure. As illustrated in FIG. 4B, an area can include a plurality of traffic control devices 410-1 and 410-2 (cumulatively referred to as "traffic control devices 410"). It is noted that while two traffic control devices are shown in the area illustrated in FIG. 4B, embodiments of the present disclosure do not limit a quantity of traffic control devices in an area.

As previously discussed, each of the traffic control devices 410 can operate as a node of a peer-to-peer network to host a decentralized, distributed database (e.g., implemented using a block chain technique). As previously discussed, a control node 408 can be configured to monitor traffic conditions within the area, determine the presence of an emergency vehicle 402 in the area, control the overall traffic flow through the area via the traffic control devices 410.

The emergency vehicle 402 can be registered with the block chain and/or the network of nodes (e.g., the traffic control devices 410-3 and the control node 408). In some embodiments, the emergency vehicle 402 can be permanently registered. In some embodiments, a status of the emergency vehicle 402 can be determined and/or set by the control node 408. For instance, a vehicle normally not designated as an "emergency vehicle" can be temporarily promoted to the status of the emergency vehicle 402.

A route to a destination 421 can be communicated and/or determined in various ways. As an example, a route to the destination 421 can be determined by the emergency vehicle 402 and subsequently communicated to the control node 408. In another example, a route to the destination 421 can be determined by the control node 408 and communicated to the emergency vehicle 402. In this example, a determined route (e.g., determined by the control node 408) can be communicated to the emergency vehicle 402, which can travel based on the determined route, and/or the control node 408 can simultaneously guide the emergency vehicle 402 to the destination 421.

Data from emergency vehicle 402 can be directly and/or indirectly communicated to vehicles 404-1, 404-2, 404-3, 404-4, and/or 404-5 (collectively referred to as vehicles 404). For example, the data may be communicated to vehicles 404 via control node 408 and/or traffic control devices 410. In this example, a dispatch of emergency vehicle 402 along with data to be transmitted to vehicles 404 can be detected/received at a network (e.g., network 406) including a control node 408 and traffic control node 410. The control node 408 may redirect the data to those traffic control devices that are capable of communicating directly with vehicles 404, as further described below.

As illustrated in FIG. 4B, vehicles 404-1 and 404-2 are within a particular proximity to emergency vehicle 402 (e.g., as indicated by an dotted circle 407-1). Stated differently, vehicles 404-1 and 404-2 may be close (e.g., to emergency vehicle) sufficient to communicate with emergency vehicle 402 via device to device (D2D) and/or vehicle to vehicle (V2V) communication technologies, as previously described in connection with FIGS. 2 and 3. In this example, accordingly, data being broadcasted by the emergency vehicle 402, while on its dispatch, may be directly communicable to and receivable at vehicles 404-1 and 404-2.

As illustrated in FIG. 4B, vehicles 404-3, 404-4, and 404-5 are within a particular proximity to traffic control devices 410-1 and 410-2, respectively, without being within a particular proximity to emergency vehicle 402 (e.g., as indicated by dotted circles 407-2 and 407-3, respectively). State differently, vehicles 404-3 and 404-4 may be close (e.g., to traffic control device 410-1) sufficient to traffic control device 410-1 to be able to communicate with the traffic control device 410-1. Similarly, vehicle 404-5 may be close (e.g., to traffic control device 410-2) sufficient to traffic control device 410-2 to be able to communicate with the traffic control device 410-2.

Accordingly, although data and/or information being broadcasted by the emergency vehicle 402 may not be communicable to and/or receivable at vehicles 404-1, 404-2, and/or 404-3, the data and/or information can be received indirectly via traffic control devices 410-1 and 410-2. As an example, the emergency vehicle 402 may firstly communicate data with control node 408 and/or other traffic control devices 410, which can further communicate the data with traffic control devices 410-1 and/or 410-2, which can communicate the data to vehicles 404-3, 404-4, and/or 404-5. In this example, the data that would not have been communicated directly from emergency vehicle 402 can still be communicated, which can cover a wider communication area.

Therefore, various ways of verifying an identity of emergency vehicles (e.g., emergency vehicle 402) and further exchanging information associated with dispatches of the emergency vehicles may be simultaneously and/or selectively employed to cover different scenarios. As an example, information associated with dispatches of emergency vehicles can be communicated to vehicles (e.g., vehicles 404-3, 404-4, and/or 404-5) indirectly via traffic control devices (e.g., traffic control devices 410-1 and/or 410-2) to cover those locations, in which vehicles may not be able to directly communicate with emergency vehicles. At the same time, direct communication between emergency vehicles and other vehicles may be simultaneously employed, which can provide benefits such as a faster exchange of information.

The verification can involve providing a public key, a public identification, and a certificate (e.g., identity information) that were generated at emergency vehicle 402 to vehicle 404. As described herein, the identity information can be received directly from emergency vehicle 402 or indirectly from traffic control devices 410. As an example, the traffic control device 410-1 can provide identity information to vehicles 404-3 and 404-4, while the traffic control device 410-2 can provide identity information to vehicles 404-5.

In response to receiving identity information, respective vehicles 404 can perform a particular process to verify an identity of emergency vehicle 402 as further described in connection with FIG. 8. When an identity of emergency vehicle 402 is verified, respective vehicle 404 can provide a host message back to emergency vehicle 404, respective traffic control devices 410, which can propagate to other traffic control devices 410 and/or emergency vehicle 404. As an example, vehicles 404-1 and 404-2 that are within a communicable proximity to emergency vehicle 402 can provide a host message directly back to emergency vehicle 402, while vehicles 404-3, 404-4, and/or 404-5 can provide a host message back to traffic control devices 410-1 and 410-2, respectively. In contrast, when an identity of emergency vehicle 402 is not verified at respective vehicle 404, the received identity information may be discarded.

In some embodiments, the identity information may be provided as encrypted. For example, control node 408 and/or traffic control devices 410 can encrypt identity information of emergency vehicle 402 using a public key previously received from respective vehicles 404 such that the encrypted identity information, when received by the respective vehicles 404, can be decrypted using a private key that was generated along with the public key of the respective vehicles 404. As an example, vehicles 404-3 and 404-4 may receive identity information encrypted at traffic control device 410-1, and vehicle 404-5 may receive identity information encrypted at traffic control device 410-2. Further details of encryption and/or decryption are described in connection with FIGS. 6-8.

Upon providing a host message, further information can be received directly and/or indirectly (e.g., via traffic control devices 410) from emergency vehicle 402. Such information can include a type of emergency vehicle (e.g., police cars, firefighting cars, and/or ambulances), a type of emergency (e.g., reason for the dispatch), a vehicle identification number (VIN), a Unified Diagnostic Services (UDS) key, license plate combinations (e.g., numbers and/or letters) a destination of the dispatch, an expected travel time to the destination, a route to the destination, and/or a distance between the emergency vehicle and the destination, although embodiments are not so limited. The information can, in some embodiments, further includes various requests (e.g., a notification to perform an action) from emergency vehicle 402 such as to pull over, to stop the vehicle, to reduce a speed of the vehicle, to clear or exit a roadway, to park as soon as possible, to assist others on the road in an emergency, etc.

Figure 5:
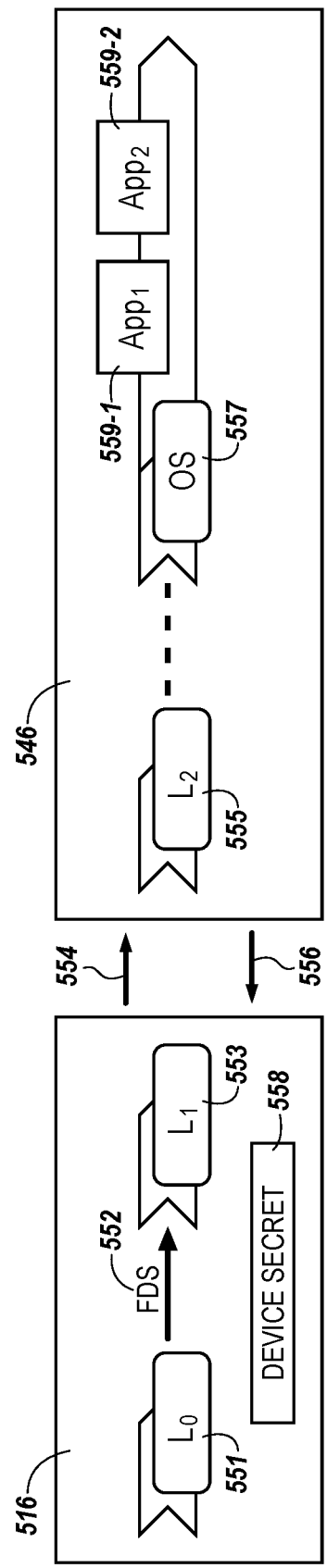
FIG. 5 is a block diagram of an example system including communication components in accordance with an embodiment of the present disclosure.

FIG. 5 is a block diagram of an example system including communication components in accordance with an embodiment of the present disclosure. For example, as illustrated in FIG. 5, communication (e.g., communication 554 and/or 556) can be between a first communication component 516 (that may be analogous to emergency communication component 202 described in connection with FIG. 2) and a second communication component 546 (e.g., that may be analogous to vehicular communication component 346 described in connection with FIG. 3). However, embodiments are not so limited. For example, communication (e.g., communication 554 and/or 556) can between vehicles (e.g., vehicles 104) and other devices (e.g., memory devices 1012) that can be implemented in control node 408 and/or traffic control device 410.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 5, Layer 0 ("$L_0$") 551 and Layer 1 ("$L_1$") 553 are within the emergency communication component 516. Layer 0 551 can provide a Firmware Derivative Secret (FDS) key 552 to Layer 1 553. The FDS key 552 can describe the identity of code of Layer 1 553 and other security relevant data. In an example, a particular protocol (such as robust internet of things (RIOT) core protocol) can use the FDS 552 to validate code of Layer 1 553 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 558 can be used to create the FDS 552 and be stored in memory of the emergency communication component 516, such that FDS 552 is unique to emergency communication component 516.

The emergency communication component 516 can transmit data, as illustrated by arrow 554, to the vehicular communication component 546. The transmitted data can include a vehicular identification that is public (e.g., 765 in FIG. 7), a certificate (e.g., a vehicular certificate 781), and/or a vehicular public key (e.g., 783). Layer 2 ("$L_2$") 555 of the vehicular communication component 546 can receive the transmitted data and execute the data in operations of the operating system ("OS") 557 and on a first application 559-1 and a second application 559-2.

In an example operation, the emergency communication component 516 can read the device secret 558, hash an identity of Layer 1 553, and perform a calculation including:

$$K_{L1}=KDF[Fs(s), \text{Hash (``immutable information'')}]$$

where $K_{L1}$ is a vehicular public key, KDF (e.g., KDF defined in the National Institute of Standards and Technology (NIST) Special Publication 800-108) is a key derivation function (e.g., HMAC-SHA256), and Fs(s) is the device secret 558. FDS 552 can be determined by performing:

$$FDS=HMAC\text{-}SHA256[Fs(s), SHA256(``immutable information'')]$$

Likewise, the vehicular communication component 546 can transmit data, as illustrated by arrow 556, including an identification that is public (e.g., vehicular public identification), a certificate (e.g., a vehicular certificate), and/or a public key (e.g., vehicular public key).

Figure 6:
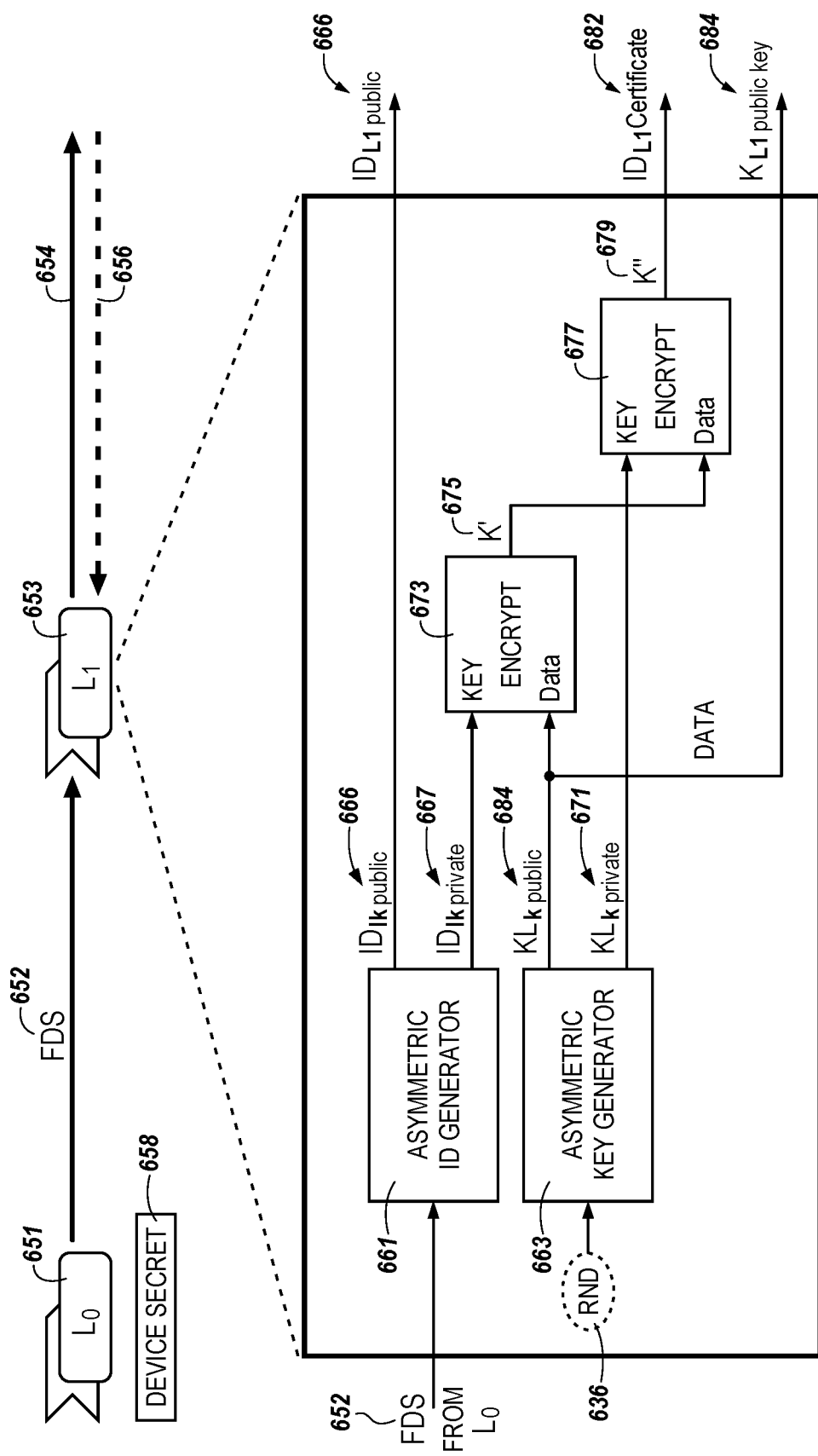
FIG. 6 is a block diagram of an example process to determine a number of parameters in accordance with an embodiment of the present disclosure.

FIG. 6 is a block diagram of an example process to determine a number of parameters in accordance with an embodiment of the present disclosure. FIG. 6 is an example of a determination of the parameters including emergency public identification, emergency certificate, and emergency public key that are then sent, indicated by arrow 654, to Layer 2 (e.g., Layer 2 555) of a vehicular communication component (e.g., 546 in FIG. 5). Layer 0 ("$L_0$") 651 in FIG. 6 corresponds to Layer 0 551 in FIG. 5 and likewise FDS 652 corresponds to FDS 552, Layer 1 653 corresponds to Layer 1 553, and arrows 654 and 656 correspond to arrows 554 and 556, respectively.

The FDS 652 from Layer 0 651 is sent to Layer 1 653 and used by an asymmetric ID generator 661 to generate a public identification ("$ID_{lk\ public}$") 666 and a private identification 667. In the abbreviated "$ID_{lk\ public}$," the "lk" indicates Layer k (in this example Layer 1), and the "public" indicates that the identification is openly shared. The public identification ("$ID_{L1public}$") 666 is illustrated as shared by the arrow extending to the right and outside of Layer 1 653 of emergency communication component. The generated private identification 667 is used as a key input into an encryptor 673. The encryptor 673 can be any processor, computing device, etc. used to encrypt data.

Layer 1 653 of an emergency communication component can include an asymmetric key generator 663. In at least one example, a random number generator (RND) 636 can optionally input a random number into the asymmetric key generator 663. The asymmetric key generator 663 can generate a public key ("$K_{Lk\ public}$") 684 (referred to as a vehicular public key) and a private key ("$K_{LK\ private}$") 671 (referred to as a vehicular private key) associated with an emergency communication component such as emergency communication component 516 in FIG. 5. The emergency public key 684 can be an input (as "data") into the encryptor 673. The encryptor 673 can generate a result K'675 using the inputs of the emergency private identification 667 and the emergency public key 684. The emergency private key 671 and the result K'675 can be input into an additional encryptor 677, resulting in output K'' 679. The output K'' 679 is emergency certificate ("$ID_{L1}$ certificate") 682 transmitted to the Layer 2 (555 of FIG. 5). The vehicular certificate 682 can provide an ability to verify and/or authenticate an origin of data sent from the emergency communication component. As an example, data sent from the emergency communication component can be associated with an identity of the emergency communication component by verifying the certificate, as will be described further in association with FIG. 7. Further, the emergency public key ("$K_{L1\ public\ key}$") 684 can be transmitted to Layer 2. Therefore, the public identification 666, the certificate 682, and the public key 684 of a Layer 1 653 of an emergency communication component can be transmitted to Layer 2 of a vehicular communication component.

Figure 7:
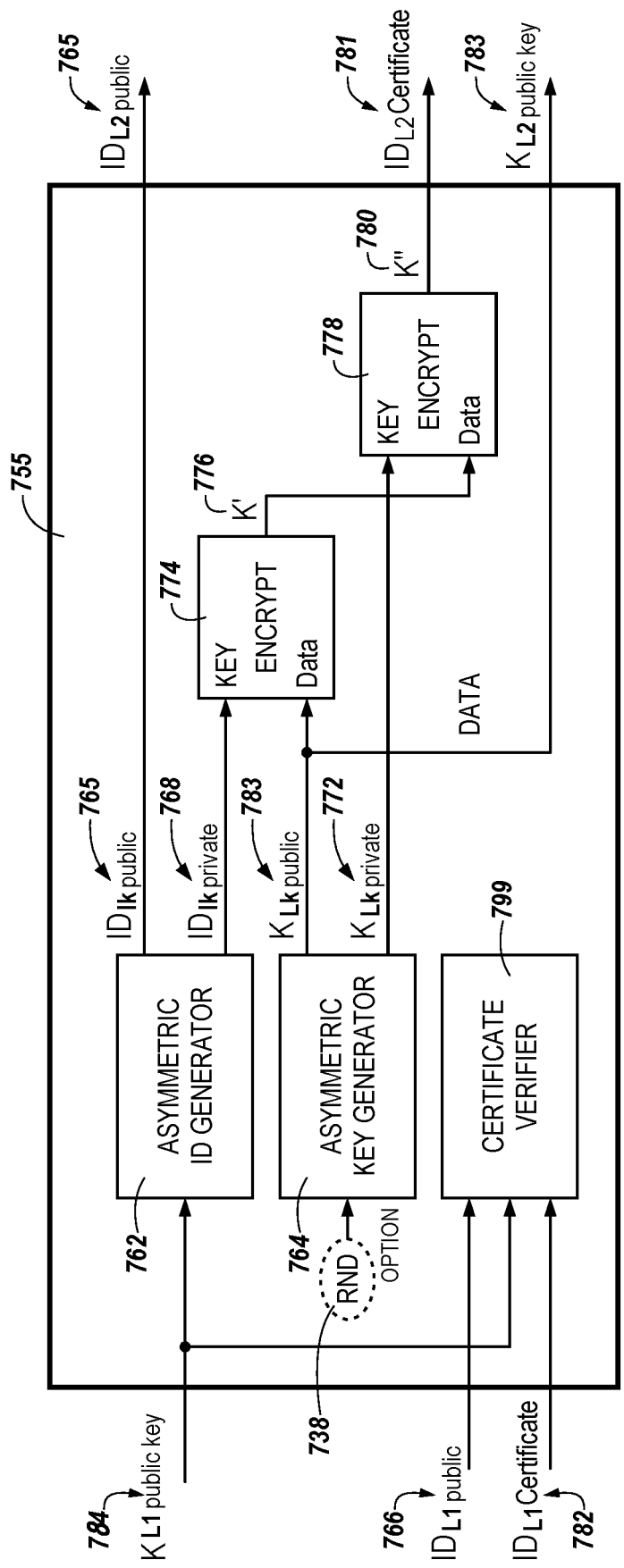
FIG. 7 is a block diagram of an example process to verify a certificate in accordance with an embodiment of the present disclosure.

FIG. 7 is a block diagram of an example process to determine a number of parameters in accordance with an embodiment of the present disclosure. FIG. 7 illustrates a Layer 2 755 of a vehicular communication component (e.g., vehicular communication component 546 in FIG. 4B) generating a vehicular identification ("$ID_{L2\ public}$") 765, an vehicular certificate ("$ID_{L2}$ Certificate") 781, and a vehicular public key ("$K_{L2\ public\ key}$") 783.

The vehicular public key ("$K_{L1\ public\ key}$") 784 transmitted from Layer 1 of the vehicular communication component to Layer 2 755 of a vehicular communication component (e.g., vehicular component 546 as described in FIG. 5), is used by an asymmetric ID generator 762 of the vehicular communication component to generate a public identification ("$ID_{lk\ public}$") 765 and a private identification 768 of the vehicular communication component. In the abbreviated "$ID_{lk\ public}$," the "lk" indicates Layer k (in this example Layer 2), and the "public" indicates that the identification is openly shared. The public identification 765 is illustrated as shared by the arrow extending to the right and outside Layer 2 755. The generated private identification 768 is used as a key input into an encryptor 774.

As shown in FIG. 7, the vehicular certificate 782 and public identification 766, along with the vehicular public key 784, are used by a certificate verifier 799. The certificate verifier 799 can verify the vehicular certificate 782 received from the vehicular communication component, and determine, in response to the vehicular certificate 782 being verified or not being verified, whether to accept or discard data received from the vehicular communication component. Further details of verifying a vehicular certificate 781 are further described herein (e.g., in connection with FIG. 9).

Layer 2 755 of the vehicular communication component can include an asymmetric key generator 764. In at least one example, a random number generator (RND) 738 can optionally input a random number into the asymmetric key generator 764. The asymmetric key generator 764 can generate a public key ("$K_{Lk\ public}$") 783 (referred to as a vehicular public key) and a private key ("$K_{LK\ private}$") 772 (referred to as a vehicular private key) associated with a vehicular communication component such as vehicular communication component 546 in FIG. 5. The vehicular public key 783 can be an input (as "data") into the encryptor 774. The encryptor 774 can generate a result K' 776 using the inputs of the vehicular private identification 768 and the vehicular public key 783. The vehicular private key 772 and the result K' 776 can be input into an additional encryptor 778, resulting in output K'' 780. The output K'' 780 is the vehicular certificate ("$ID_{L2}$ certificate") 781 transmitted back to the Layer 1 (553 of FIG. 5). The vehicular certificate 781 can provide an ability to verify and/or authenticate an origin of data sent from the vehicular communication component. As an example, data sent from the vehicular communication component can be associated with an identity of the vehicular communication component by verifying the certificate, as will be described further in association with FIG. 7. Further, the vehicular public key ("$K_{L2\ public\ key}$") 783 can be transmitted to Layer 1. Therefore, the public identification 765, the certificate 781, and the vehicular public key 783 of the vehicular communication component can be transmitted to Layer 1 of a vehicular communication component.

In an example, in response to a vehicular communication component receiving a public key from a vehicular communication component, the vehicular communication component can encrypt data to be sent to the vehicular communication component using the vehicular public key. Vice versa, the vehicular communication component can encrypt data to be sent to the vehicular communication component using the vehicular public key. In response to the vehicular communication component receiving data encrypted using the vehicular public key, the vehicular communication component can decrypt the data using its own vehicular private key. Likewise, in response to the vehicular communication component receiving data encrypted using the vehicular public key, the vehicular communication component can decrypt the data using its own vehicular private key. As the vehicular private key is not shared with another device outside the vehicular communication component and the vehicular private key is not shared with another device outside the vehicular communication component, the data sent to the vehicular communication component and the vehicular communication component remains secure.

Figure 8:
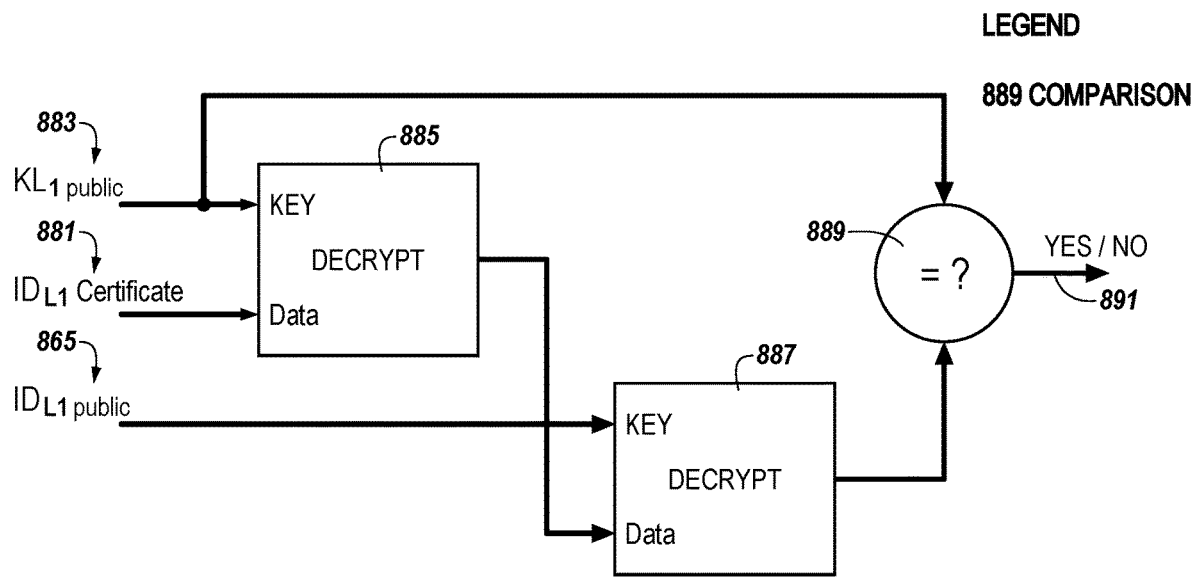
FIG. 8 is a block diagram of an example process to determine a number of parameters in accordance with an embodiment of the present disclosure.

FIG. 8 is a block diagram of an example process to verify a certificate in accordance with an embodiment of the present disclosure. In the illustrated example of FIG. 8, a public key 883, a certificate 881, and a public identification 865 is provided from a communication component (e.g., from Layer 1 553 of emergency communication component 516 in FIG. 5). The data of the certificate 881 and the emergency public key 883 can be used as inputs into a decryptor 885. The decryptor 885 can be any processor, computing device, etc used to decrypt data. The result of the decryption of the certificate 881 and the emergency public key 883 can be used as an input into a secondary decryptor 887 along with the public identification, result in an output. The A comparison 889 can be performed between emergency public key 883 and the output from the decryptor 887 to indicate whether the certificate is verified, resulting in a yes or no 891 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 9:
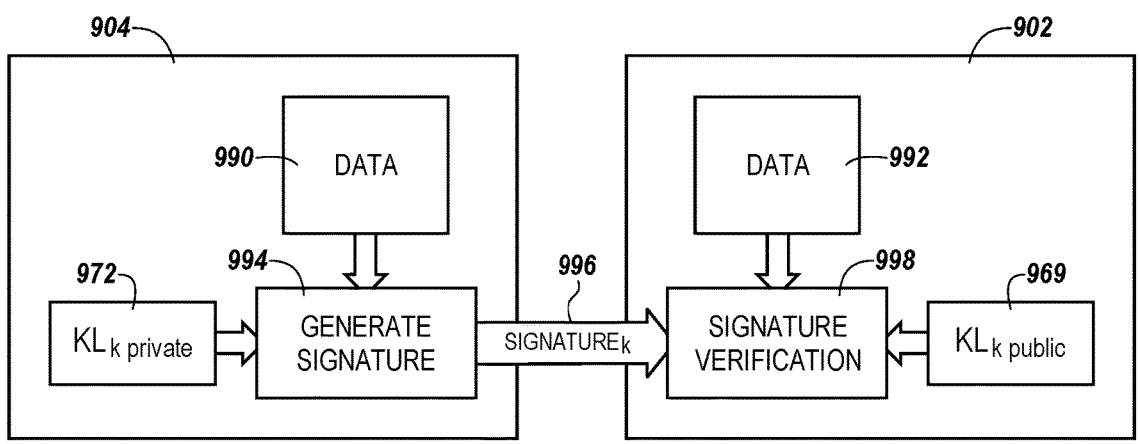
FIG. 9 is a block diagram of an example process to verify a signature in accordance with an embodiment of the present disclosure.

FIG. 9 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A vehicle 904 (such as vehicle 104 in FIG. 1) can send data 990 to an emergency vehicle 902 (such as vehicle 102 in FIG. 1). The vehicle 904 can generate, at 994, a signature 996 using a remote private key 972. The signature 996 can be transmitted to the emergency vehicle 902. The emergency vehicle 902 can verify, at 998, using data 992 and the vehicle public key 969. In this way, signature verification operates by using a private key to encrypt the signature and a public key to decrypt the signature. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the vehicle can verify the digital signature by using an internal cryptography process (e.g., Elliptical Curve Digital signature (ECDSA) or a similar process.

Figure 10:
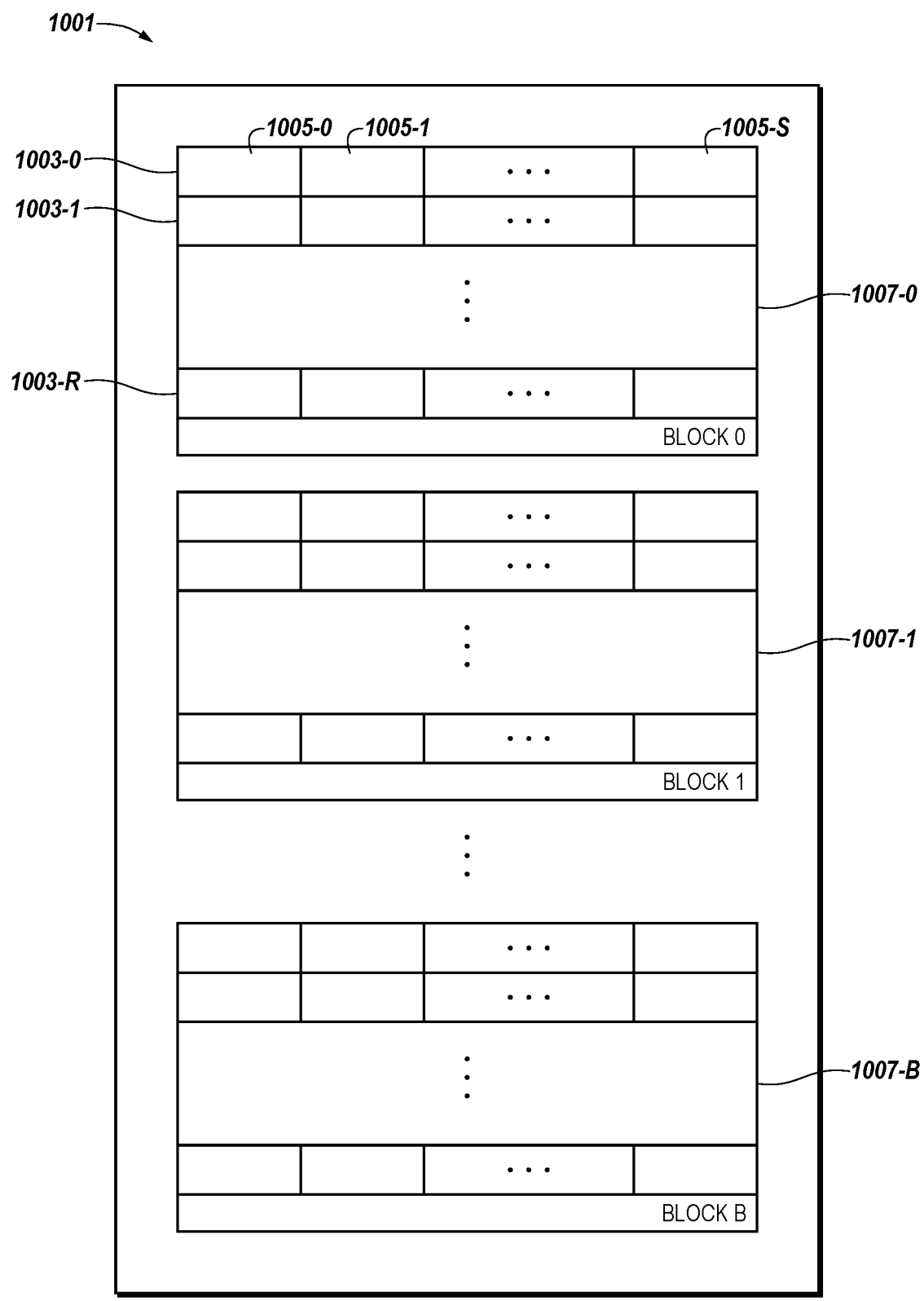
FIG. 10 illustrates a diagram of a portion of a memory array having a number of physical blocks in accordance with an embodiment of the present disclosure.

FIG. 10 illustrates a diagram of a portion of a memory array 1001 having a number of physical blocks in accordance with an embodiment of the present disclosure. Memory array 1001 can be, for example, a flash memory array such as a NAND, and/or NOR flash memory array. In one example embodiment, the memory array 1001 is a NOR flash memory array. As an additional example, memory array 1001 can be a resistance variable memory array such as a PCRAM, RRAM, MMRAM, or spin torque transfer (STT) array, among others. However, embodiments of the present disclosure are not limited to a particular type of memory array. Further, memory array 1001 can be a secure memory array, as will be further described herein. Further, although not shown in FIG. 10, memory array 1001 can be located on a particular semiconductor die along with various peripheral circuitry associated with the operation thereof.

As shown in FIG. 10, memory array 1001 has a number of physical blocks 1007-0 (BLOCK 0), 1007-1 (BLOCK 1), . . . , 1007-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 1001 may be 128 blocks, 512 blocks, or 1,024 blocks, but embodiments are not limited to a particular power of two or to any particular number of physical blocks in memory array 1001.

A number of physical blocks of memory cells (e.g., blocks 1007-0, 1007-1, . . . , 1007-B) can be included in a plane of memory cells, and a number of planes of memory cells can be included on a die. For instance, in the example shown in FIG. 10, each physical block 1007-0, 1007-1, . . . , 1007-B can be part of a single die. That is, the portion of memory array 1001 illustrated in FIG. 10 can be a die of memory cells.

As shown in FIG. 10, each physical block 1007-0, 1007-1, . . . , 1007-B includes a number of physical rows (e.g., 1003-0, 1003-1, . . . , 1003-R) of memory cells coupled to access lines (e.g., word lines). The number of rows (e.g., word lines) in each physical block can be thirty two rows, but embodiments are not limited to a particular number of rows 1003-0, 1003-1, . . . , 1003-R per physical block. Further, although not shown in FIG. 10, the memory cells can be coupled to columns of sense lines (e.g., data lines and/or digit lines).

As one of ordinary skill in the art will appreciate, each row 1003-0, 1003-1, . . . , 1003-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 1003-0, 1003-1, . . . , 1003-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 10, a page of memory cells can comprise a number of physical sectors 1005-0, 1005-1, . . . , 1005-S (e.g., subsets of memory cells). Each physical sector 1005-0, 1005-1, . . . , 1005-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 1005-0, 1005-1, . . . , 1005-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 1007-0, 1007-1, . . . , 1007-B, rows 1003-0, 1003-1, . . . , 1003-R, sectors 1005-0, 1005-1, . . . , 1005-S, and pages are possible. For example, rows 1003-0, 1003-1, . . . , 1003-R of physical blocks 1007-0, 1007-1, . . . , 1007-B can each store data corresponding to a single logical sector which can include, for example, more or less than 512 bytes of data.

Figure 11A:
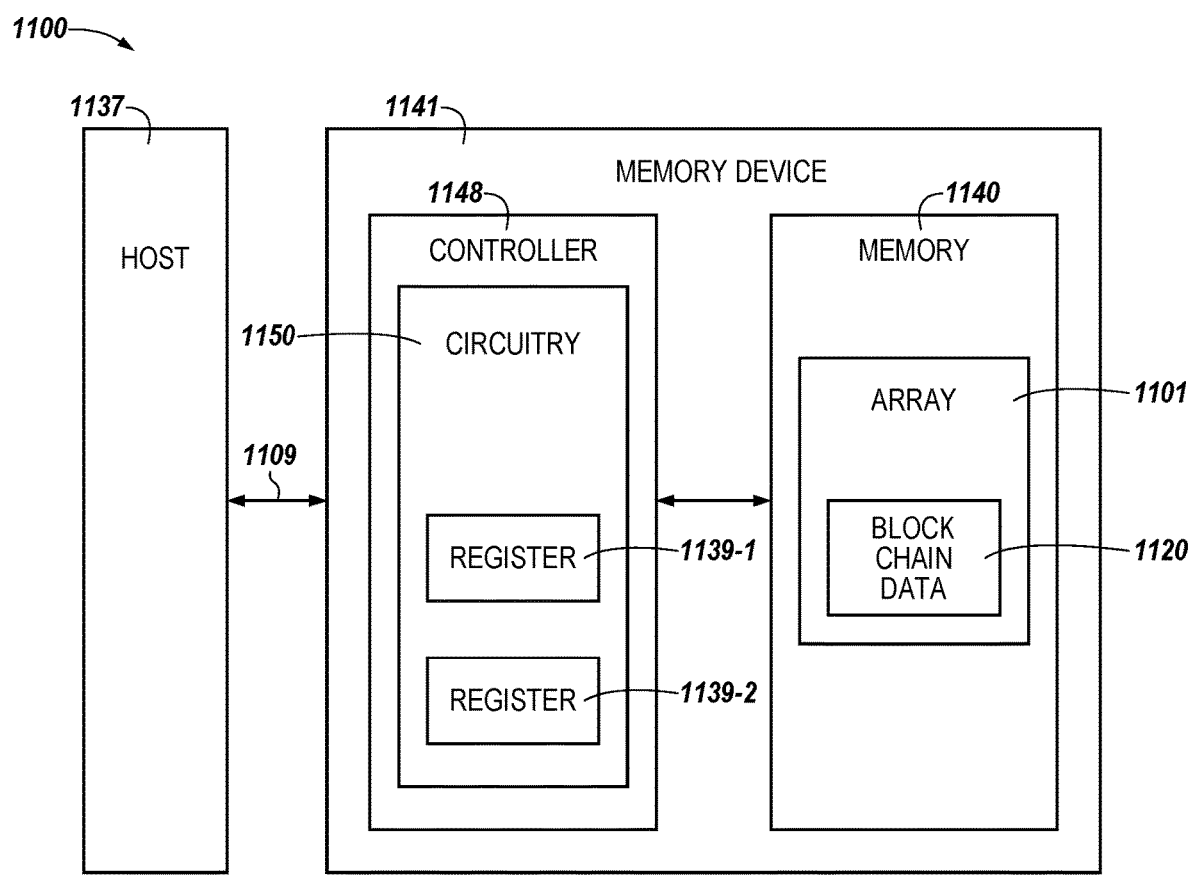
FIG. 11A is a block diagram of a computing system including a host and an apparatus in the form of a memory device in accordance with an embodiment of the present disclosure.

FIG. 11A is a block diagram of a computing system 1100 including a host 1137 and an apparatus in the form of a memory device 1141 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 1100 can include a number of memory devices analogous to memory device 1141. In one example embodiment, as shown more in FIG. 11A, computing system 1100 may represent a node within a larger network of nodes such as a distributed, peer to peer network.

In the embodiment illustrated in FIG. 11A, memory device 1141 can include a memory 1140 having a memory array 1101. As shown in FIG. 11A, memory 1140 can store "block chain data" 1120, used in block chain technology systems, in the memory array 1101. A "block" of block chain data in a block chain technology system can include data (e.g., payload), headers, encryption, history, timestamps, etc. As will be described further herein in connection with FIGS. 12 and 13, the block chain data 1120 may be "local block chain" data and/or "global block chain" data and may include a stored global block chain ledger (e.g., "global ledger block chain" data) and/or a stored local block chain ledger (e.g., "local ledger block chain" data).

Memory array 1101 can be analogous to memory array 1001 previously described in connection with FIG. 10. However, as used herein a block of block chain data in a block chain architecture does not have to equate to the size of a block of memory as described previously in connection with FIG. 1. Hence, the term "global block" and/or "local block", when stored in memory in memory as block chain data, do not have to equate to a block size unit of memory. A global block and/or local block may be smaller, equivalent, and/or larger than a block size unit, e.g., denomination, associated with a particular memory architecture or design. Further, memory array 1101 can be a secure array, as will be further described herein in connection with FIGS. 14A and 14B. Although one memory array 1101 is illustrated in FIG. 11A, memory 1140 can include any number of memory arrays analogous to memory array 1101.

As illustrated in FIG. 11A, host 1137 can be coupled to the memory device 1141 via interface 1109. Host 1137 and memory device 1141 can communicate (e.g., send commands and/or data such as block chain data 1120) on interface 1109. Host 1137 and/or memory device 1141 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 1109 can be in the form of a standardized physical interface. For example, when memory device 1141 is used for information storage in computing system 1100, interface 1109 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. Interface 1109 can provide an interface for passing control, address, information (e.g., data), and other signals between memory device 1141 and a host (e.g., host 1137) having compatible receptors for interface 1109.

Memory device 1141 includes controller 1148 to communicate with host 1137 and with memory 1140 (e.g., memory array 1101). For instance, controller 1148 can send commands to perform operations on memory array 1101, including operations to sense (e.g., read), program (e.g., write), move, and/or erase data (e.g., "local" and/or "global" block chain data), among other operations. Again, the intended meaning of the terms "global block" and/or "local block" for block chain data in block chain technology and systems are defined in connection with FIGS. 12 and 13.

Controller 1148 can be included on the same physical device (e.g., the same die) as memory 1140. Alternatively, controller 1148 can be included on a separate physical device that is communicatively coupled to the physical device that includes memory 1140. In an embodiment, components of controller 1148 can be spread across multiple physical devices (e.g., some components on the same die as the memory, and some components on a different die, module, or board) as a distributed controller.

Host 1137 can include a host controller (not shown FIG. 11A) to communicate with memory device 1141. The host controller can send commands to memory device 1141 via interface 1109. The host controller can communicate with memory device 1141 and/or the controller 1148 on the memory device 1141 to read, write, and/or erase data (e.g., "local" and/or "global" block chain data), among other operations. Further, in an embodiment, host 1137 can be an IoT enabled device, as previously described herein, having IoT communication capabilities.

Figure 12:
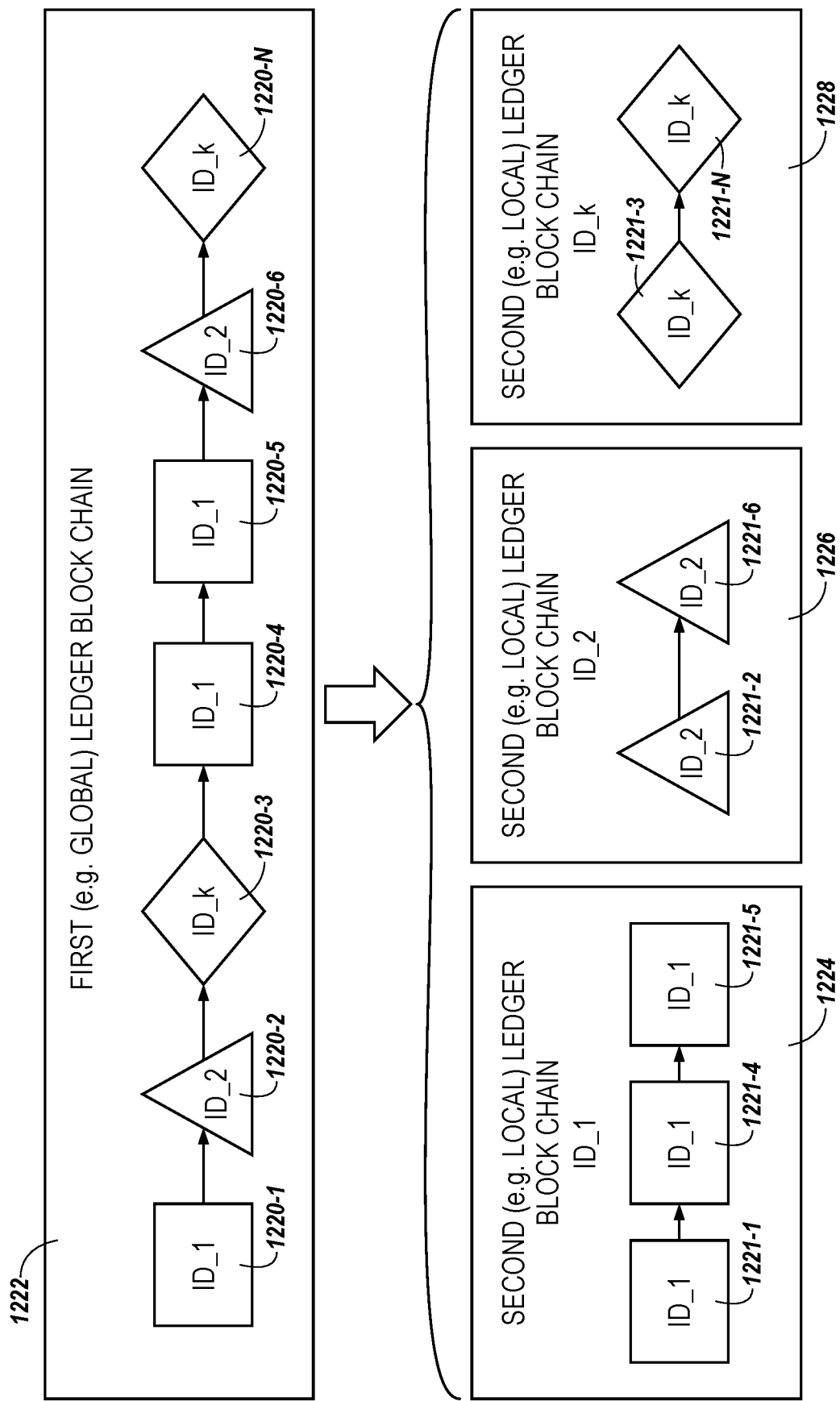
FIG. 12 illustrates an example of an exchange between a global ledger block chain and local ledger block chains as can be operated upon by circuitry and stored in a memory for secure updates stored in memory in accordance with an embodiment of the present disclosure.
Figure 13:
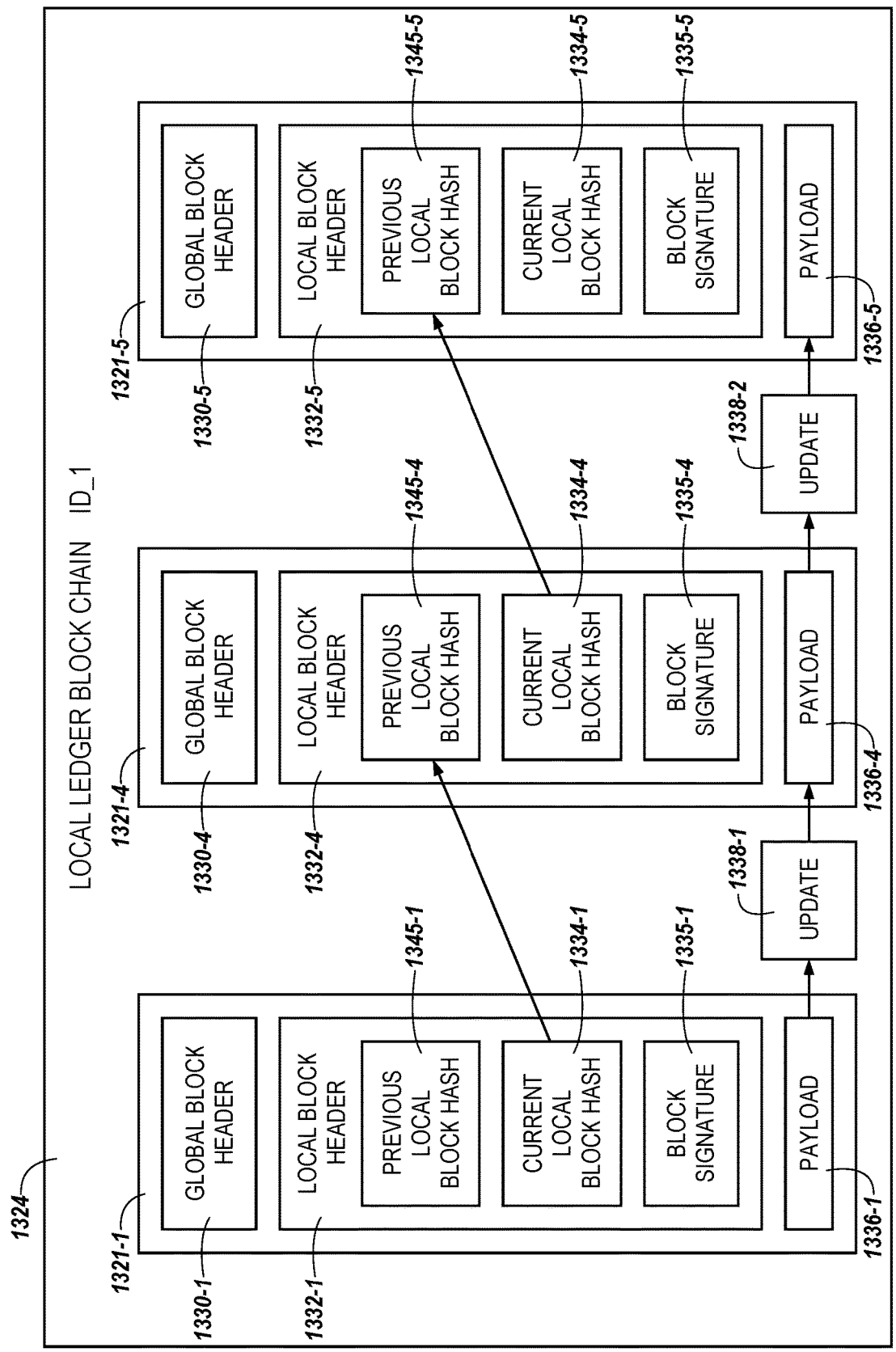
FIG. 13 illustrates an example of a local ledger block chain for secure updates stored in memory in accordance with an embodiment of the present disclosure.

Controller 1148 on memory device 1141 and/or the host controller on host 202 can include control circuitry and/or logic (e.g., hardware and firmware) configured to perform the block chain operations described herein, e.g., in connection with FIGS. 12 and 13, according to, for example DICE-RIoT architecture and/or protocol. In an embodiment, controller 1148 on memory device 206 and/or the host controller on host 1137 can be an application specific integrated circuit (ASIC) coupled to a printed circuit board including a physical interface. Also, memory device 1141 and/or host 1137 can include a buffer of volatile and/or non-volatile memory and a number of registers.

For example, as shown in FIG. 11A, memory device can include circuitry 1150. In the embodiment illustrated in FIG. 11A, circuitry 1150 is included in controller 1148. However, embodiments of the present disclosure are not so limited. For instance, in an embodiment, circuitry 1150 may be included in (e.g., on the same die as) memory 1140 (e.g., instead of in controller 1148). Circuitry 1150 can comprise, hardware, firmware, and/or communicate instructions to a processing resource to perform the block chain operations described herein, e.g., in connection with FIGS. 12 and 13 using encryption techniques explained in FIGS. 5-9, according to, for example DICE-RIoT architecture and/or protocol.

For example, circuitry 1150 can be configured to receive a global block of block chain data (defined in FIGS. 12 and 13) to be added as a local block of block chain data, e.g., 1120, on a local ledger block chain (also defined in FIGS. 12 and 13) within an array 1101 in memory 1140. For example, a local block of block chain data, e.g., 1120, may be a validated received global block of block chain data and may be generated and/or added to the local ledger block chain (shown in FIGS. 12 and 13) for validating (e.g., authenticating and/or attesting) an update to data stored in memory 1140 (e.g., in memory array 1101). The global block to be added as a local block in the local ledger block chain can include multiple headers.

In an embodiment, a subset of array 1101, or the whole array 1101 can be a secure array (e.g., an area of memory 1140 to be kept under control). FIG. 11A illustrates a pair of registers 1139-1 and 1139-2 although embodiments are not so limited, and one or more registers could be used. For example, the data stored in memory array 1101 can include sensitive (e.g., non-user) data, such as host firmware and/or code to be executed for sensitive applications. In such an embodiment, a pair of non-volatile registers can be used to define the secure array. For example, in the embodiment illustrated in FIG. 11A, circuitry 1150 includes registers 1139-1 and 1139-2 that can be used to define the secure array. For instance, register 1139-1 can define the address (e.g., the starting LBA of the data) of the secure array, and register 1139-2 can define the size (e.g., the ending LBA of the data) of the secure array. An example of such registers, and their use in defining a secure array, will be further described herein in connection with FIGS. 14A-14B).

Once the secure array has been defined, circuitry 1150 can be used to generate (e.g., calculate) a cryptographic hash associated with the secure array, which may be referred to herein as a golden hash, using authenticated and anti-replay protected commands (e.g., so that only memory device 1141 knows the golden hash, and only memory device 1141 is capable of generating and updating it). The golden hash may be stored in inaccessible portion of memory array 1101 (e.g., the same inaccessible portion in which block chain data 1120 and the local ledger block chain is stored) and can be used during the process of validating the data of the secure array.

In one example embodiment, memory device 1141 (e.g., using circuitry 1150) can send, via interface 1109, the block chain data 1120 (which may be a received global block from the global ledger block chain), along with the digital signature associated with block chain data 1120, to the host 1137 for validation of the update (e.g., the payload of the block chain data) before updating data stored in memory array 1101. For example, circuitry 1150 can sense (e.g., read) the block chain data 1120 received and stored in memory array 1101, and send the sensed block chain data 1120 to host 1137 for validation of the update to the data stored in array 1101, responsive to a powering (e.g., a powering on and/or powering up) of memory device 1141. As such, a validation of the update to the data stored in memory array 1101 can be initiated (e.g., automatically) upon the powering of memory device 1141.

As an additional example, circuitry 1150 can send the block chain data 1120, along with the digital signature associated with block chain data 1120, to host 1137 upon an external entity, such as host 1137, initiating a validation of an update to the data stored in memory array 1101. For instance, host 1137 can send a command to memory device 1141 (e.g., circuitry 1150) to sense the block chain data 1120, and circuitry 1150 can operate on the command to sense the block chain data 1120 and send the sensed block chain data 1120 to host 1137 for validation of the data stored in array 1101, responsive to receipt of the command.

Upon receiving the block chain data 1120, host 1137 can validate (e.g., determine whether to validate) the data stored in memory array 1101 using the received block (e.g., the payload of the received global block). For example, as will be explained further in connection with FIGS. 3 and 4, host 1137 can use the cryptographic hash of the previous block in the block chain and the cryptographic hash of the data stored in memory array 1101 to validate the data. Further, host 1137 can validate the digital signature associated with the block chain data 1120 to determine the local block is included (e.g., is eligible to be included) in the local ledger block chain. As used herein, validating the update to the data stored in memory array 1101 can include, and/or refer to, authenticating and/or attesting that the update is genuine (e.g., is the same as originally programmed), and has not been altered by hacking activity, frequently provided by a hacker, or other including unauthorized changes.

In embodiments in which memory array 1101 is a secure array, a golden hash, as described further in connection with FIGS. 3 and 4, may also be used to validate the update to the data stored in memory array 1101. For example, a run-time cryptographic hash can be generated (e.g., calculated), and compared with the golden hash. If the comparison indicates the run-time and golden hashes match, it can be determined that the secure array has not been altered, and therefore the data stored therein is valid. If, however, the comparison indicates the run-time and golden hashes do not match, this may indicate that the data stored in the secure array has been changed (e.g., due to a hacker or a fault in the memory), and this can be reported to host 1137.

In one example embodiment, in addition to the validation of the data stored in memory array 1101, circuitry 1150 can validate the block chain data 1120 (e.g., the received global block from the global ledger block chain) to determine if the block chain data 1120 is from an authorized entity (e.g., a known entity), and that the hash indicated on the received block chain data 1120 matches the most recent local block of block chain data on the local ledger block chain. In response to the validation of the block chain data 1120, the circuitry 1150 can be configured to provide the update included in the block chain data 1120 to augment, modify, and/or replace code (or a portion of code) stored in the secure array.

As will be explained further in connection with FIGS. 12 and 13, after the validation of the block chain data 1120 serving as a local block in a local ledger block chain stored in memory array 1101, circuitry 1150 can generate an additional (e.g., the next) local block (e.g., receive the next global block form the global ledger block chain) to be added to the local ledger block chain for updating the data stored in memory array 1101, in a manner analogous to which the previous block chain data 1120 was generated/received. For example, this additional local block of block chain data 1120 can include a cryptographic hash of the previous block in the local ledger block chain, and a new cryptographic hash of a new update to the data stored in memory array 1101. Further, this additional local block can include a header having a timestamp indicating when this block was generated (e.g., received as an additional global block), and can have a digital signature associated therewith that indicates this additional local block is from an authorized entity and may be included in the local ledger block chain. An example illustrating such an additional local block will be further described herein (e.g., in connection with FIG. 3). Further, in embodiments in which memory array 1101 is a secure array, an additional (e.g., new) golden hash can be generated.

The additional local block of block chain data, as well as the digital signature associated with the additional local block, and the additional golden hash, can be stored in memory array 1101 as part of the local ledger block chain. For example, the additional local block can replace the block chain data 1120 (e.g., the previous block chain data 1120) in memory array 1101. The additional block chain data, digital signature, and additional golden hash can then be used by host 1137 to validate the update (e.g., the payload) to the data stored in memory array 1101, in a manner analogous to that previously described herein for block chain data 1120. Additional local blocks in the local ledger block chain can continue to be generated by circuitry 1150 when they are received as global blocks, validated by the host 1137, and used by host 1137 to validate the update to the data stored in memory array 1101, in such manner throughout the lifetime of memory device 1141.

The embodiment illustrated in FIG. 11A can include additional circuitry, logic, and/or components not illustrated so as not to obscure embodiments of the present disclosure. For example, memory device 1141 can include address circuitry to latch address signals provided over I/O connectors through I/O circuitry. Address signals can be received and decoded by a row decoder and a column decoder, to access memory array 1101. Further, memory device 1141 can include a main memory, such as, for instance, a DRAM or SDRAM, that is separate from and/or in addition to memory array 1101. An example further illustrating additional circuitry, logic, and/or components of memory device 1141 will be further described herein (e.g., in connection with FIG. 15).

Figure 11B:
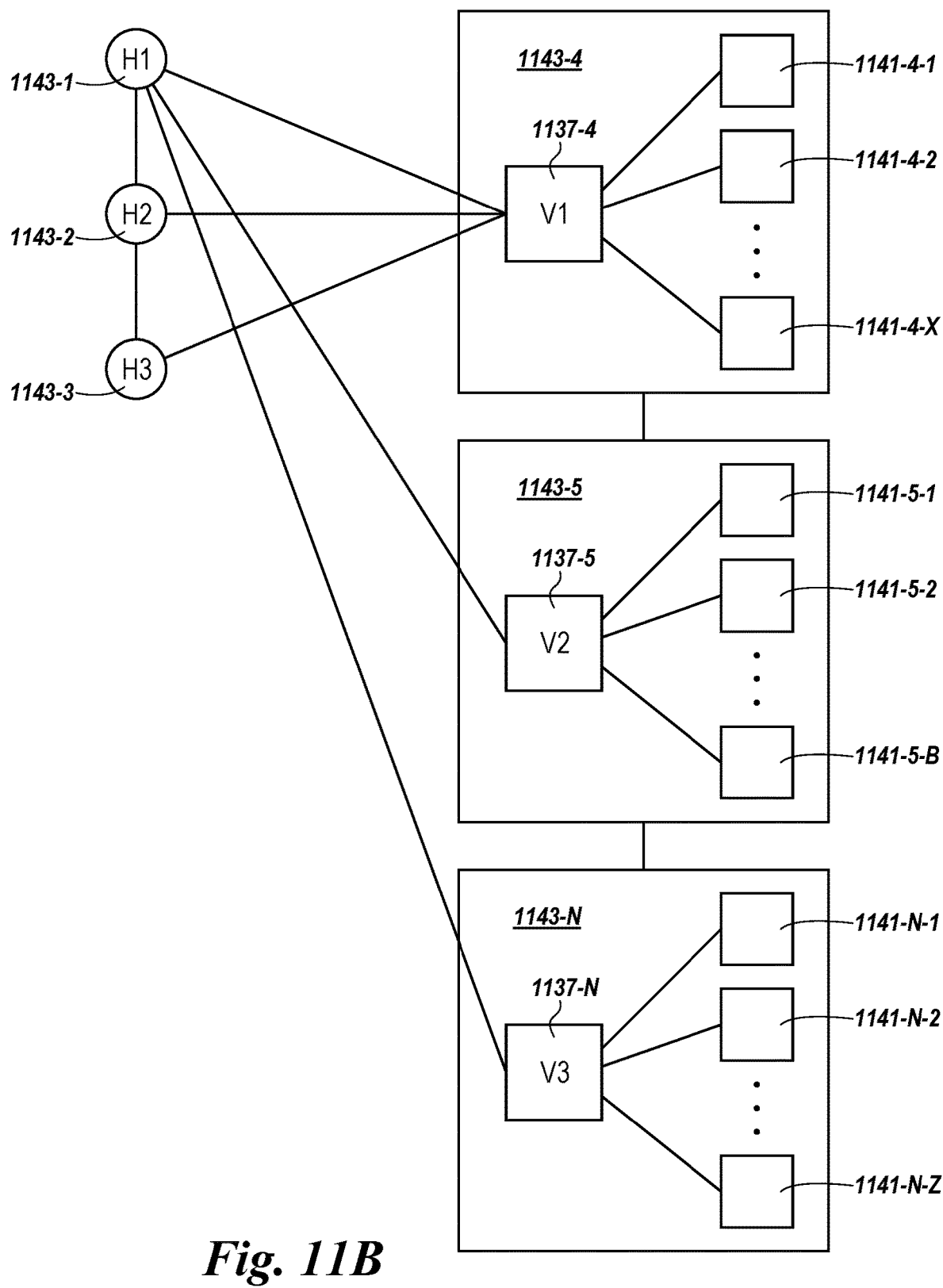
FIG. 11B is a block diagram of a network of computing systems which can include many computing nodes in a public and/or private network connected in a wired and/or wireless manner using wireless protocols such as peer to peer to peer and Internet Protocol (IP) in accordance with an embodiment of the present disclosure.

FIG. 11B is a block diagram of a network of computing systems which can include many computing nodes in a public and/or private distributed network, such as a peer to peer network, connected in a wired and/or wireless manner using wireless protocols and Internet Protocol (IP) in accordance with an embodiment of the present disclosure. In the example of FIG. 11B, multiple nodes, 1143-1, 1143-2, 1143-3, . . . , 1143-N, are shown connected in a network such as a peer to peer network. The network can support a distributed ledger technology (DLT) such as "block chain" technology. A distributed ledger is a database that is spread over several nodes or computing devices.

A "block chain" is a continuously growing, encrypted list of records. Block chain is one form of a DLT in which multiple nodes, 1143-1, 1143-2, 1143-3, . . . , 1143-N, can share and store the distributed list of records in a peer to peer network, manner. As described herein a "block" in block chain is collection of information, e.g., data, headers, transactions, encryption, etc. A block may be added to the growing list of records in the ledger if it is validated. Blocks are added to the block chain ledger in chronological order.

Hence, in the example of FIG. 11B, a given node, 1143-1 (H1), 1143-2 (H2), 1143-3 (H3), . . . , 1143-N, may maintain a copy of a current list or records in ledger. The multiple nodes, 1143-1, 1143-2, 1143-3, . . . , 1143-N, may each represent a different host, e.g., computing device with processing resources. For ease of illustration, the hosts or multiple nodes, 1143-1, 1143-2, 1143-3, . . . , 1143-N, may be considered in relation to a block chain for autonomous and/or non-autonomous transportation vehicles, cars, buses, emergency vehicles, etc. Embodiments, however, are not limited to this example.

In this example, a public or private entity's (e.g., a military entity, an airport manager, a hotel owner, a hospital entity, etc.) servers may represent one node, e.g., 1143-1, on the network of nodes, 1143-1, 1143-2, 1143-3, . . . , 1143-N, shown in FIG. 11B. A certified repair facility such as a dealership repair shop may represent another node, e.g., 1143-2. Node 1143-3 may be another host, e.g., another computing device, connected to the peer to peer network via the Internet and/or other wireless connections.

The public or private entity associated with node 1143-1 may maintain a "first block chain ledger" having chronologically linked blocks of data related to a particular subject matter associated with node 1143-1, e.g., maintain a first block chain ledger for all the vehicles associated with that public or private entity. For ease of illustration, and not by way of limitation, the referenced "first block chain ledger", having chronologically linked blocks of data related to a particular subject matter associate with a particular node, e.g., for all the vehicles associated with a given public or private entity, may also be referred to herein as a "global block chain ledger" (or, "global ledger block chain"). The public or private entity can distribute the first block chain ledger ("global ledger block chain") to other nodes, 1143-2, 1143-3, etc., in the peer to peer network and to its vehicles, connected as nodes to the network, in a wired and/or wireless manner. Various wireless communication technologies can be utilized in communicating with different nodes, 1143-1, 1143-2, 1143-3, . . . , 1143-N. For example, different generations of broadband mobile telecommunication technologies (e.g., first through fifth generation (1-5G)), device-to-device (e.g., vehicle to vehicle (v2v)), to communication including Bluetooth, Zigbee, and/or LTE device-to-device communication technologies, and/or other wireless communication utilizing an intermediary devices (e.g., WiFi utilizing an access point (AP)) may be utilized in communicating with different nodes.

In the example of FIG. 11B, node 1143-4 may represent a particular vehicle belonging to a subset or class of vehicles associated with a public or private entity by the particular public or private entity represented by node 1143-1. In this example, node 1143-5 may represent another particular vehicle, in the same or different subset or class of vehicles associated with the public or private entity or, alternatively, not be related to the public or private entity associated with node 1143-1. Similarly, node 1143-N may represent another particular vehicle, in the same or different subset or class of vehicles associated with the public or private entity or, alternatively, not be related to the public or private entity associated with node 1143-1.

Each node may have its own processing resource, e.g., host connected to one or more memory devices such as illustrated in FIG. 11A. Thus, vehicle nodes 1143-4, 1143-5, and 1143-N may each include a single and/or multiple host, e.g., processing resources, 1137-4, 1137-5, 1137-N, respectively. Each host on a given vehicle node, 1143-4, 1143-5, and 1143-N, may connect to multiple memory devices on each vehicle. For example, memory devices 1141-4-1, 1141-4-2, 1141-4-X may be associated with host 1137-4 on node 1143-4, memory devices 1141-5-1, 1141-5-2, and 1141-5-B may be associated with host 1137-5 on node 1143-5, and memory devices 1141-N-1, 1141-N-2, and 1141-N-Z may be associated with host 1137-N on node 1143-N.

In this example, node 1143-1 may regularly send, e.g., distribute, to nodes 1143-4, 1143-5, . . . , and 1143-N an updated copy of the continuously growing first, e.g. "global", block chain ledger (also referred to herein as "global ledger block chain") maintained by node 1143-1 containing chronological blocks, e.g., data, related to the subject matter of all the vehicles associated with the public or private entity. According to block chain technology, node 1143-1 may share a copy of the first, e.g., "global", ledger block chain with other nodes, 1143-1, 1143-2, 1143-3, . . . , 1143-N in the distributed network. However, not all of the "blocks" in the growing first, e.g., "global" ledger block chain maintained by node 1143-1 and received to other particular nodes, 1143-4, 1143-5, . . . , 1143-N, may be authentic and/or relevant to other particular nodes. For example, particular vehicles, e.g., nodes 1143-4, 1143-5, . . . , 1143-N, may belong to a subset or sub-class of vehicles associated with the public or private entity associated with node 1143-1, but only particular blocks in the first, e.g., "global", ledger block chain may relate to a particular node 1143-4, 1143-5, . . . , 1143-N, e.g., particular vehicle, in that subset or sub-class of vehicles. As such, according to embodiments disclosed herein, a particular node, 1143-4, 1143-5, . . . , 1143-N, may validate only those blocks authenticated and relevant to that node, 1143-4, 1143-5, . . . , 1143-N.

According to example embodiments, a particular node, e.g., 1143-4, may validate and add blocks, authenticated and relevant to the node, to a second block chain ledger which may be a subset of fewer that all of the blocks contained in the global ledger block chain received from node 1143-1 to node 1143-4. Node 1143-4 may store the subset of the "global ledger block chain" as a "local block chain ledger" (also referred to herein as "local ledger block chain") on the respective node, 1143-4, 1143-5, . . . , 1143-N. Node 1143-4 may also share the local ledger block chain with other nodes. However, same is not required and the local ledger block chain is termed "local" in that it may remain "local" only to that particular node 1143-4, e.g., the host and/or memory devices of a particular vehicle. Thus, for ease of illustration, the second block chain ledger ("local ledger block chain") may be referred to herein as a local ledger block chain. The node, e.g., 1143-4, may receive many global blocks associated with other global ledger block chains, pertaining to various subject matter, via the network of nodes to which it is connected. However, the node, e.g., 1143-4, may be selective as to which blocks it accepts add allows to be added to its local ledger block chain. As explained in greater detail in connection with FIGS. 12 and 13, embodiments of the present disclosure may use the encryption techniques described in FIGS. 5-9 to validate and add blocks relevant to a particular node, 1143-4, 1143-5, . . . , 1143-N, and store and maintain those blocks on the particular node, 1143-4, 1143-5, . . . , 1143-N, as a "local ledger block chain" data, e.g., as transactions associated with a particular vehicle (e.g., emergency vehicle) that is in possession of a local ledger block chain. In one example, a single host (such as shown in FIG. 11A) or multiple host on a particular vehicle, e.g., nodes 1143-4, 1143-5, . . . , 1143-N, can maintain a local ledger block chain. As an example, a single or multiple host can maintain a distributed ledger on the node according to techniques described in co-pending, co-filed U.S. application Ser. No. 07/260,390, entitled "USING MEMORY AS A BLOCK IN A BLOCK CHAIN". In this example, a transaction (e.g., record of a dispatch) relevant to a particular vehicle, e.g., node 1143-4, 1143-5, . . . , 1143-N, may be validated and added to the "local ledger block chain" of the node, 1143-4, 1143-5, . . . , 1143-N, or alternatively discarded.

FIG. 12 illustrates an example of an exchange between a global ledger block chain 1222 and local ledger block chains 1224, 1226, and 1228 as can be operated upon by circuitry and stored in a memory and/or secure array, e.g., by circuitry 1150 and memory 1140 in FIG. 11A. In this example secure updates to data may be validated and stored in memory such as memory array 1101 described in connection with FIG. 11A. As used herein, block" according to block chain technology in a block chain ledger or system can include data (e.g., payload), headers, encryption, history, timestamps, etc. Again, a "block" in a block chain does not have to correlate to or equate to the size of a block of memory, as explained as a storage unit of memory in FIG. 10.

Further, as used herein, the term "global block" is a block in the first block ledger which in the example is maintained and shared across a larger system or network of entities. A "local block" is a block only in a local ledger block chain, maintained as a subset of data relevant to a particular node, e.g., 1100-4, as a subset of particular subject matter relevant to a subset of vehicles or more specific class of entities within a system or network of entities, e.g., memory device 1101 in FIG. 11A. Neither a global block or a local block chain have to equate to a block size of a particular memory architecture. A global block and/or local block may be smaller, equivalent, and/or larger than a block size denomination associated with a particular memory architecture or design.

As shown in FIG. 12, a first, e.g., global ledger block chain 1222 can be related to subject matter associated with node 1100-1 in FIG. 11B. The global ledger block chain can include global blocks 1220-1, 1220-2, 1220-3, 1220-4, 1220-5, 1220-6, and 1220-N. When operated upon by circuitry and logic described herein, the global blocks 1220 can be validated and accepted into second, e.g., local, ledger block chains 1224, 1226, and 1228, shown as local blocks 1221-1, 1221-2, 1221-3, 1221-4, 1221-5, 1221-6, and 1221-N. Second, e.g., local, ledger block chains 1224, 1226, and 1228 may be maintained by nodes 1100-4, 1100-5, . . . , 1100-N shown in FIG. 11B, respectively therein. Alternatively, if not validated to a local ledger block chain maintained on a particular node, e.g., nodes 1100-4, 1100-5, . . . , 1100-N shown in FIG. 11B, the respective global blocks of the global ledger block chain can be rejected therefrom.

For example, when global block chain data is received by a particular memory to be validated and stored as a local block within local ledger block chain, global block chain data has to be validated by circuitry and logic, e.g., circuitry 1150 in FIG. 11A, before it becomes a local block within local ledger block chain. In the example of FIG. 12, global block 1220-1 has been validated, e.g., by circuitry 1150, to become local block 1221-1 in local ledger block chain 1224, global block 1220-2 has been validated to become local block 1221-2 in local ledger block chain 1226, global block 1220-3 has been validated to become local block 1221-3 in local ledger block chain 1228, global block 1220-4 has been validated to become local block 1221-4 in local ledger block chain 1224, global block 1220-5 has been validated to become local block 1221-5 in local ledger block chain 1224, global block 1220-6 has been validated to become local block 1221-6 in local ledger block chain 1226, and global block 1220-N has been validated to become local block 1221-N in local ledger block chain 1228.

In one example embodiment, the global blocks 1220 can be received to a memory device, e.g., 1101 in FIG. 11A, validated, and added (e.g., generated) to a local ledger block chain 1224, 1226, or 1228, by using the circuitry 1150 described in FIG. 11A. In the example of FIG. 12, global block 1220-4 has been received and validated to become local block 1221-4. Local block 1221-4 can be added to the local ledger block chain 1224 after local block 1221-1 has been validated by the circuitry and logic described herein. As described further in connection with FIG. 13, local block 1221-1 is used to validate global block 1220-4 as an update of data stored in the memory. In this example, local block 1221-4 can be accepted and stored as the next block in the local ledger block chain 1224 after local block 1221-1). The global ledger block chain 1222 can include blocks in a block chain configuration, architecture, and/or protocol from multiple hosts (e.g., the host 1102 described in connection with FIG. 11A).

A host and/or memory may maintain, e.g., store, local ledger block chains 1224, 1226, 1228 and include only the validated global blocks that are relevant to a particular host and/or memory. As an example, a local ledger block chain associated with a particular entry node may only store data that relates to traffic in and out of that entry point as blocks in that particular local ledger block chain. Global blocks 1220 may include identifiers for a particular host and/or memory associated with the data included in the global block. For example, local ledger block chain 1224 is shown associated with a particular host/memory identifier (ID_1). Thus, circuitry associated with this host/memory relationship will validate only related global blocks such that local ledger block chain 1224 will include only local blocks 1221-1 (global block 1220-1 from global ledger block chain 1220), local block 1221-4 (global block 1220-4 from global ledger block chain 1220), and local block 1221-5 (global block 1220-5 from global ledger block chain 1220). As an example, local ledger block chain 1224 may be associated with a first node or device (e.g., control node 408). Local ledger block chain 1226 is shown associated with another host and/or memory identifier (ID_2). As an example, local ledger block chain 1226 may be associated with a second node or device (e.g., traffic control device 410-1). Thus, circuitry associated with this host/memory relationship will validate only related global blocks such that local ledger block chain 1226 will include local block 1221-2 (global block 1220-2 from global ledger block chain 1220), and local block 1221-6 (global block 1220-6 from global ledger block chain 1220). Local ledger block chain 1228 is shown associated with another host and/or memory identifier (ID_k) (e.g., a third node or device such as traffic control device 410-3). Thus, circuitry associated with this host/memory relationship will validate only related global blocks (related to all entry points into a location) such that local ledger block chain 1228 will include the local block 1221-3 (global block 1220-3 from global ledger block chain 1220), and local block 1221-N (global block 1220-N from global ledger block chain) as these blocks pertain to that particular entry node or access point.

Using a local ledger block chains (e.g., 1224, 1226, 1228) to store appropriate block chain data as updates to the memory of a respective host and/or memory relationship (e.g., ID_1, ID_2, and ID_k) can provide secure updates to data stored in a given memory device (e.g., the memory device 1141 of FIG. 11A) in association with a given host. As such, the circuitry and logic described herein allow for the exchange and organization shown in FIG. 12. For example, circuitry is configured to receive a global block e.g., 1220-4 from a global ledger block chain 1222 and determine whether the global block 1220-4 is related to a particular the host and/or memory relationship. If the global block 1220-4 is related to the particular host and/or memory, e.g., a comparison of encrypted hash for respective identifiers (e.g., ID_1, ID_2, and ID_k) according to block chain techniques match, the circuitry may add the global block 1220-4 to its local ledger block chain 1224. Global block 1220-4 of block chain data can include a payload of an update to data included in a secure array associated with the host and/or memory. The circuitry described herein, e.g., circuitry 1150, may validate the global block 1220-4 by checking, e.g., comparing, a cryptographic hash of a current local block e.g., 1221-1 in the local ledger block chain 1224 and a cryptographic hash of the data stored in the memory to be updated, contained in global block 1220-4. The current local block 1221-1 of the local ledger block chain 1224 also has a digital signature associated therewith which is similarly compared to indicate whether the global block 1220-4 is from an authorized entity (e.g., includes an identifier ID_1 evidencing that global block 1220-4 is from an entity associated with the particular host and/or memory relationship including the local ledger block chain 1224). As explained in connection with FIG. 13, if validated the current local block 1221-1 will become the "previous" local block and global block 1220-4 will become the then "current" local block 1221-4 in the local ledger block chain 1224. The contents of the local blocks 1221 of the local ledger block chain 1224 (e.g., and/or 1226, 1228) are described in detail in connection with FIG. 13.

An authorized entity may provide the global ledger block chain 1222 as a public ledger which may be distributed to all and/or a portion of the hosts and/or memory that concur the global ledger block chain 1222 to receive access to a particular location. For example, the global ledger block chain 1222 may be generated and maintained by an entity which may monitor traffic into and out of a particular location, roadway, etc. For example, the global ledger block chain 1222 may be generated and monitored by a public or private entity (e.g., a military entity, an airport manager, a hotel owner, a hospital entity, etc.) that then monitors particular vehicles as they move in and out of a location. Each of the global blocks 1220 within the global ledger block chain 1222 may include entrance and exit data for a vehicle with a particular identifier. For instance, as illustrated by FIG. 12, the global blocks 1220-1, 1220-4, 1220-5 correspond to host and/or memory ID_1, global blocks 1220-2, 1220-6, correspond to host and/or memory ID_2, and global blocks 1220-3, 1220-N correspond to host and/or memory ID_k. Where the different ID's correspond to a different host and/or memory relationship (e.g., different vehicles).

In this instance, the public or private entity generates and monitors the global ledger block chain 1222 such that each instance of an update of dispatch of particular vehicles (e.g., or a particular subset of vehicles sharing the identifier) is recorded as an immutable record in the global ledger block chain 1222. For example, global block 1220-1 includes an update for a vehicle (e.g., or data in the memory associated with the vehicle) associate with ID_1, global block 1220-2 includes an update for vehicles associated with ID_2 and so on. The global blocks 1220 are assembled in sequential order as they are produced by the public or private entity and each global block 1220 can include a digital signature indicating an identity of particular vehicles (e.g., emergency vehicles). In this way, the public or private entity may keep an immutable record of all of the updates (e.g., enters and exits, movements, etc.) generated for the different vehicles monitored.

As used in block chain technology, and described more in connection with FIG. 13, the global blocks 1220 in the global ledger block chain 1222 can include multiple headers and encryption. For example, the global block of a global ledger block chain can include a global block header including a cryptographic hash data (e.g., a link to) to the previous global block and a hash including a cryptographic hash data to a previous local block. Thus, when the global block is received by the host 1102 and/or memory device 1141 in FIG. 11A, the global block to be added to the local ledger block chain can include a cryptographic hash (e.g., a link to) a current local block (e.g., in block chain data 1120) in the local ledger block chain and a cryptographic hash of the update to data stored in the memory device 1141 (e.g., a payload). The block chain data 1120 in a local ledger block-chain can also include a digital signature associated therewith that indicates that the global block is from an authorized entity.

Stated differently, a global block from a global ledger block chain may be received by the host and/or the memory, e.g., host 1102 and/or memory 1140 shown in FIG. 11A, and the circuitry and/or logic on the host and/or the memory may determine if the global block is related to the host and/or the memory. If so, the global block and its contents may be validated to become a new local block of block chain data stored in a local ledger block chain (e.g., as part of block chain data 1120 stored on the array 1101 of the memory 1140 in FIG. 11A). The local block can also include a header having a timestamp indicating when the local block was generated/received.

The cryptographic hash of the data stored in a memory array, e.g., memory array 1101 of FIG. 11A) to be updated, altered, configured, an/or otherwise changed by the data included in the received/generated local blocks, and/or the cryptographic hash of the previous local block in the local ledger block chain, can comprise, for instance, a SHA-256 cryptographic hash. Further, the cryptographic hash of the data stored in memory array, and the cryptographic hash of the previous local block in the local ledger block chain, can each respectively comprise 256 bytes of data.

The cryptographic hash of the data stored in memory array can be generated (e.g., calculated), by circuitry, e.g., circuitry 1150 in FIG. 11A. In such an example, the cryptographic hash of the data stored can be internally generated by memory device, e.g., memory device 1141 in FIG. 11A, without having external data moving on a host/memory device interface, e.g., interface 1109 in FIG. 11A. As an additional example, the cryptographic hash of the data can be communicated from an external entity. For instance, a host can generate the cryptographic hash of the data stored in a memory array and send the generated cryptographic hash to a memory device e.g., circuitry of the memory device can receive the cryptographic hash of the data stored in memory array from host.

Further, a digital signature associated with a local block can be generated (e.g., calculated), by circuitry based on (e.g., responsive to) an external command, such as a command received from a host. The digital signature can be generated using symmetric or asymmetric cryptography. The digital signature may include a freshness field in the form of the previous local block on the global ledger block chain (which should match the current local block on the local ledger block chain when the block is added). As an additional example, a host can generate the digital signature, and send (e.g., provide) the generated digital signature to a memory device.

The freshness field, described herein, may change with each global block that is added to the local ledger block chain. Accordingly, the freshness field may be used to validate the incoming global block is the correct block to be added as the next block in the local ledger block chain. The incoming global block is verified to be the next local block to be added to the local ledger when the digital signature indicates that the incoming global block is related to the host, and the previous local block field (the freshness) of the incoming global block is the same as the current local block in the local ledger block chain. Because the freshness can also be used to calculate the digital signature, the digital signature can be different with each incoming global block.

As mentioned, the digital signature can be, for instance, a digital signature generated using asymmetric cryptography (e.g., based on a public and/or private key), and can comprise, for instance, an elliptical curve digital signature. As an additional example, the signature can be generated using symmetric cryptography (e.g., based on a unique secret key shared between a host and a memory device). The secret key can be exchanged by using any asymmetric protocol (e.g., the Diffie-Hellman protocol). In other examples, the key may be shared with a host in a secure environment (e.g., factory production, secure manufacturing, as a vehicle is associated with a public or private entity, etc.). The generation and validation of the secret key is discussed further in connection with FIGS. 5-9.

As described in connection with FIG. 11A, such block chain data 1120 can be stored in a memory array, e.g., memory array 1101 in FIG. 11A. The block chain data 1120 can be stored in a portion of memory array 1101 that is inaccessible to a user of memory device and/or host (e.g., in a "hidden" region of memory array). Storing a local block and/or local ledger block chain of block chain data in a particular memory array can simplify the storage of the local block by removing the need for software storage management for the local block.

In the example of FIG. 12, global block 1220-6 can include a global header having a field for a hash of a previous global block 1220-5, where the previous global block field indicates the preceding block in the global ledger block chain 1222. A different hash in the global header can include a previous local block field, where the previous local block field indicates the preceding global block with an identifier of same host and/or memory ID.

For example, global block 1220-6 may include a local block field with a hash for global block 1220-2 (the previous related global block) because they are both vehicle ID_2. In this way, a particular host and/or memory device relationship (e.g., for a vehicles, or subset of vehicles) may receive multiple global blocks 1220 from the global ledger block chain 1222, and determine which global blocks 1220 to accept as a local blocks and which global blocks 1220 to discard.

For example, the local ledger block chain 1224 may be included in a memory device and/or memory associated with a particular host through an identifier in the form of a host (e.g., a vehicle) with ID_1. The circuitry as described herein can be configured to store global blocks 1220 in the memory associated with the host vehicle as part of the local ledger block chain 1224. In other words, the circuitry is configured to receive multiple global blocks 1220 from the global ledger block chain 1222, and when the circuitry determines that the global block(s) 1220 belong to the host vehicle associated with vehicle ID_1, they are accepted as local blocks 1221 and added to the local ledger block chain 1224.

Specifically, in an example, a host vehicle and/or memory associated with the host vehicle with an ID_1 includes, e.g., may store, the local ledger block chain 1224 and the circuitry and/or memory may receive multiple global blocks 1220-1, 1220-2, 1220-3, 1220-4, 1220-5, 1220-6, and 1220-N from the global ledger block chain 1222. The circuitry is configured to determine whether the multiple global blocks 1220 received from the global ledger block chain 1222, by the circuitry are related to the host vehicle and/or memory associated with the host vehicle ID_1. Thus, the circuitry may determine that the global blocks 1220-1, 1220-4, and 1220-5 are related to the host vehicle ID_1, and the circuitry is configured to validate and, if validated, to sequentially add global blocks 1220-1, 1220-4, 1220-5 of the multiple global blocks received from the global ledger block chain 1222 to the local ledger block chain 1224 as local blocks 1221-1, 1221-4, and 1221-5 because it has been verified that they are related to the host vehicle ID_1. In another example, a determination of whether the multiple global blocks 1220 are related to a particular gate of a location. In this way, different blocks can be sorted and associated with different entities where one local block chain ledger may be associated with a vehicle (including all enters and exits a vehicle makes) and anther local block chain ledger may be associated with a gate (including all vehicles that enter and exit that gate), etc.

In one example, the global blocks 1220-1, 1220-4, and 1220-5 can be added (sequentially) to the local ledger block chain 1224 when a previous local block field in each of the respective global blocks 1220 matches a current local block field in the current local block of the local ledger block chain 1224. Specifically, the circuitry can validate the incoming global block 1220-4 by confirming that the global block 1220-4 is from an authorized entity (e.g., the vehicle identity in the global ledger block chain 1222) and checking that the previous local block field of global block 1220-4 is a hash for local block 1221-1 (which is the same as the global block 1220-1), and checking that the current local block 1221-1 has a matching hash in its own current local block field. This procedure can be applied to add the global block 1220-5 to the local ledger block chain 1224. Thus, the global blocks 1220-1, 1220-4, and 1220-5 can become local blocks 1221-1, 1221-4, and 1221-5 in the local ledger block chain 1224. Using this method and configuration, the local ledger block chain 1224 includes multiple local blocks related to a host and/or memory associated with (ID_1) assembled in sequential order.

Additionally, the circuitry is configured to refrain from adding global blocks 1220 to the local ledger block chain 1224, when they are unrelated to the host and/or memory ID_1. Thus, the circuitry may determine that global blocks 1220-2, 1220-6, 1220-3, and 1220-N are not related to the host and/or memory ID_1 and may discard the unrelated global blocks from local ledger block chain 1224. The mechanisms described in connection with FIG. 12 may be applied to multiple hosts and/or multiple memories e.g., local ledger block chain 1226, and local ledger block chain 1228.

For example, the circuitry may generate a local ledger block chain (e.g., 1224) for validating an update to data stored in the memory (e.g., associated with ID_1) and receive global blocks (e.g., 1220-1, 1220-2, 1220-3, 1220-4, 1220-5, 1220-6, 1220-N) from a global ledger block chain 1222. The circuitry may add a first portion (e.g., 1220-1, 1220-4, 1220-5) of the global blocks to the local ledger block chain 1224 when a digital signature associated with each of the global blocks of the first portion is verified by the circuitry to be related to the host and/or memory (e.g., ID_1). The circuitry may discard a second portion (e.g., 1220-2, 1220-6, 1220-3, 1220-N) of the received global blocks when the second portion of the global blocks are determined to be unrelated to the host and/or memory associated with ID_1, (e.g., the second portion is associated with ID_2, and/or ID_k).

As is described further in connection with FIG. 13, a freshness field may be used by the circuitry to verify a global block belongs in the local ledger block chain (e.g., 1224, 1226, 1228). In the example above, each of the global blocks of the first portion (e.g., 1220-1, 1220-4, 1220-5) include a freshness field used to generate the digital signature. The freshness field for each of the global blocks of the first portion (e.g., 1220-1, 1220-4, 1220-5) corresponds to a current local block of the local ledger block chain 1224. As such, the global blocks of the first portion (e.g., 1220-1, 1220-4, 1220-5) are added to the local ledger block chain 1224 in sequential order (as local blocks 1221-1, 1221-4, and 1221-5) and stored in the memory associated with the host.

Specifically, the circuitry can generate a digital signature based on a freshness field of the global block. For instance, the circuitry may generate the freshness field of global block 1220-4 by identifying a previous local block field in the header of the global block 1220-4 (in this instance, this would be a hash of global block 1220-1 because it is the previous global block with the ID_1). Where the current local block 1221-1 of the local ledger block chain 1224 and the previous local block field (again, in this instance this would be global block 1220-1) of the global block 1220-4 of the global ledger block chain 1222 are the same.

Embodiments of the present disclosure, by utilizing local ledger block chain, can provide benefits such as implementing a block chain technology in each vehicle, which may have a limited size of storage. Unlike the global ledger block chain, a size of local ledger block chain can be comparably small, which can be implementable in each vehicle such that the vehicle may refer to the local ledger block chain instead of the global ledger block chain. The embodiments of the present disclosure can further provide benefits such as convenient way to retrieve information that are corresponding to a particular vehicle. While transactions associated with a particular vehicle may be stored over multiple blocks in a global block chain (e.g., which may result in a search of a global ledger block chain having a complex structure), transactions associated with the a particular vehicle may be readily retrieved from local ledger block chain (e.g., such that information of the transactions may be readily retrieved for a litigation associated with the particular vehicle).

FIG. 13 illustrates an example of a local ledger block chain (e.g., local ledger block chain 1324) for secure updates stored in memory (e.g., in memory array 1101 previously described in connection with FIG. 11A) in accordance with an embodiment of the present disclosure. The local ledger block chain 1324 can be similar to the local ledger block chain 1224 described in connection with FIG. 12. For ease of illustration, FIG. 13 illustrates only local ledger block chain 1324. However, examples described in connection with FIG. 13, and local ledger block chain 1324, may also be applied for other local ledger block chains (e.g., local ledger block chains 1226 and 1228 described in connection with FIG. 3). Local ledger block chain 1324 is a block chain used for validating identities of vehicles using data stored in a memory of a respective host and/or memory exchange. As one example, the host and/or memory exchange is associated with a particular identifier, e.g., identifier ID_1.

In this example, the local blocks 1321-1, 1321-4, 1321-5 of the local ledger block chain 1324 are blocks that were received as, e.g., previously, global blocks 1220-1, 1220-4, 1220-5 in the example of FIG. 3). In one example, circuitry 1150 in FIG. 11A operates on the received global blocks using block chain encryption and decryption techniques described in connection with FIGS. 5-9 to compare and validate respective a hash of the block chain data, e.g., using an SHA256 hash. When the global blocks are verified as being related to the host and/or memory (e.g., ID_1), they may become local blocks 1321-1, 1321-4, and 1321-5 and be stored as an immutable record in the local ledger block chain 1324 for the host and/or memory associated with ID_1. In this example, circuitry operates to compare a block chain hash for local block 1321-4 (e.g., previously global block 1220-4) to local block 1321-1 (e.g., previously global block 1220-1), for storage in the memory associated with the host ID_1. Once validated by the circuitry associated with the host and/or memory, the circuitry may link to the local block 1321-1. Likewise, local block 1321-5 (e.g., previously global block 1220-5) once validated by the circuitry associated with the host and/or memory may link to the local block 1321-4.

In the example of FIG. 13, each local block (e.g., 1321-1, 1321-4, and/or 1321-5 etc.) may respectively include the following information: a global block header, e.g., 1330-1, 1330-4, 1330-5, and a local block header, e.g., 1332-1, 1332-4, 1332-5. In this example, each local block header 1332-1, 1332-4, 1332-5 includes a previous local block hash 1345-1, 1345-4, 1345-5, a current local block hash 1334-1, 1334-4, 1334-5, and a block signature 1335-1, 1335-4, 1335-5. As shown in the example of FIG. 13, each local block, e.g., 1321-1, 1321-4, and 1321-5, includes a payload, e.g., 1336-1, 1336-4, 1336-5 as part of the block's information, e.g., data. As mentioned in connection with FIG. 3, each of the blocks (e.g., global and local) may include multiple headers (e.g., 1330-1, 1332-1) to link a current block to a previous block in their respective block chain ledgers (global or local).

For example, referring to the method of adding local block 1321-4 to the local ledger block chain 1324, the global block header 1330-4 may include a freshness field in the form of a hash for a previous global block having the same associated ID_1 within the global ledger block chain, as well as a hash for the current global block (to link the global ledger block chain together). Put another way, when the global block (e.g., 1220-4 of FIG. 12) is in a global ledger block chain (e.g., 1222 of FIG. 12), the freshness field in the global block header is a hash for a previous global block (e.g., 1220-1 of FIG. 12) having the same associated identifier (e.g., ID_1) in the global ledger block chain (e.g., 1222 of FIG. 12). In this example, when local block 1321-4 is being verified to be added to the local ledger block chain 1324, the current local block hash 1334-1 of the local block 1321-1 in the local ledger block chain 1324 will be the same as the freshness field in the global block header 1330-4 when the circuitry validates the incoming global block (e.g., 1220-4) to add it to the local ledger block chain 1324 as local block 1321-4. Put even another way, the freshness field of the of the global block header 1330-4 should match the current local block hash 1334-1 of the local block 1321-1 of the local ledger block chain 1324 because the current local block 1321-1 was previously global block 1220-1.

The local block headers e.g., 1332-1, 1332-4, and 1332-5 each respectively include a previous local block hash e.g., 1345-1, 1345-4, and 1345-5 (to link together the local ledger block chain 1324), and a current local block hash e.g., 1334-1, 1334-4, and 1334-5 (which is the same as an incoming global block freshness field), and block signatures e.g., 1335-1, 1335-4, 1335-5 to indicate that the block is from an authorized entity (e.g., a listed vehicle identity and/or an entity associated with a host and/or memory) and related to the host and/or memory (e.g., ID_1). The payload e.g., 1336-1, 1336-4, and 1336-5 can be data which includes a hardware, configuration, and/or software update (e.g., configuration, change in configuration, alteration to a device of the host and/or memory associated with the host, etc.) and and/or a cryptographic hash of the data stored in the memory to be updated.

For example, a host, in the form of a vehicle and/or memory associated with the vehicle having an identifier of ID_1, may include a memory and circuitry to generate a local ledger block chain 1324 for validating an update to data stored in the memory. In this example, the local ledger block chain 1324 is comprised of local block 1321-4 (e.g., global block 1220-4 of FIG. 12) taken from a global ledger block chain (e.g., 1222 of FIG. 12). The local block 1321-4 includes a current local block cryptographic hash 1334-4 of the current local block 1321-4. The current local block cryptographic hash 1334-4 may be compared to a previous local block cryptographic hash 1345-4 which was current local block hash 1334-1, as a freshness field to validate an order (e.g., a sequence) and link the local ledger block chain 1324 and a cryptographic hash of data stored in the memory to be updated (e.g., the payload 1336-1, 1336-4, and 1336-5). The local block 1321-4 of the local ledger block chain 1324 has a digital signature 1335-4 associated therewith that indicates the global block (e.g., 1220-4 of FIG. 12) was from an authorized entity and was correctly added as the local block 1321-4. In some examples, the authorized entity may be a public or private entity associated with the vehicles which is monitoring all vehicles associated with the public or private entity. In this way, the host and/or memory associated with ID_1 may check the block signature (e.g., 1335-4) and may discard global blocks received from the global ledger block chain (e.g., the global ledger block chain 1322) that are not related to the host and/or memory associated with ID_1.

The host and/or memory ID_1 can be configured to receive the local ledger block chain 1324 from the memory, validate the update (e.g., the payload 1336-1, 1336-4, and 1336-5) to the data stored in the memory using the received local ledger block chain 1324. In this way, the host and/or memory associated with ID_1 can maintain and/or monitor each of the updates provided to the host and/or memory from the authorized entity. Because the assembly of the local ledger block chain 1324 generates an immutable record, the circuitry may maintain control over what updates have taken place. This may prevent fraudulent updates, unintentional changes, unintentional error, and nefarious hacking attempts. Additionally, the maintenance of a local ledger block chain 1324 on the memory associated with the host can provide a record of updates which may be produced upon demand. After a global block from the global ledger block chain (e.g., the global ledger block chain 1222 of FIG. 12) has been validated and added to the local ledger block chain 1324, the circuitry may implement the update included in the payload e.g., 1336-1, 1336-4, and 1336-5.

For example, the local ledger block chain 1324 may validate a global block (e.g., the global block 1220-1 of FIG. 12) and add it to the local ledger block chain 1324 as the local block 1321-1. After the validation, the circuitry can execute the update 1338-1 included in the payload 1336-1 of the local block 1321-1. The authorized entity may push another update to the host and/or memory associated with ID_1, as such, the circuitry may receive a second global block (e.g., the global block 1220-4 of FIG. 12) which may be validated by the circuitry and added sequentially as local block 1321-4, linked to local block 1321-1. The circuitry may check and compare a cryptographic hash of a freshness field e.g., previous local block hash 1345-4. If valid, this validation and linking in the local ledger block chain 1324, the circuitry may execute the update 1338-2 included in the payload 1336-4 of local block 1321-4. Using this method, the memory may continue to add global blocks as local blocks to the local ledger block chain 1324 as described for local block 1321-5, etc. In some examples, the host and/or memory associated with ID_1 may remove an older portion of the local ledger block chain 1324 to create vacancy in the memory as the local ledger block chain 1324 increases when more updates are generated by the authorized entity.

For example, the host and/or memory may be a computing device of a vehicle having an ID_1, and the local ledger block chain 1324 can indicate those transactions associated with the vehicle (e.g., previous records of dispatches the vehicle has initiated). The computing device may include a threshold amount of immutable records that can be stored in the memory. In some examples, updates (e.g., 1338-1, 1338-2) are pushed from the authorized entity via global blocks to update a software and/or hardware component of the computing device, the circuitry may remove a local block (e.g., an older local block) from the local ledger block chain 1324 when the local ledger block chain 1324 has reached the threshold. The circuitry may remove an older local block (e.g., 1321-1) to create vacancy in the memory of the computing device for a newer local block (e.g., 1321-5) by executing firmware to alter the root (e.g., the root of the consensus, root of a Merkle tree, etc.) of the local ledger block chain 1324. In this way, the circuitry can maintain control of the updates as the local ledger block chain 1324 adds new local blocks.

In one embodiment, the above described global block chain and local ledger block chains can be used to securely verify identities of vehicles. As an example, as an emergency vehicle can dispatch for emergency reasons, and data can be exchanged between the vehicle and a node to securely verify identities of the vehicle. The node can use the global block chain to verify the identity of the vehicle and any other data related to that particular vehicle. The local ledger block chains can be used to pinpoint those information associated with a particular vehicle (e.g., date on which a particular emergency vehicle has dispatched, a number of times the particular emergency vehicle has dispatched during a particular period) without having to monitor the entire global block chain.

Figure 14A:
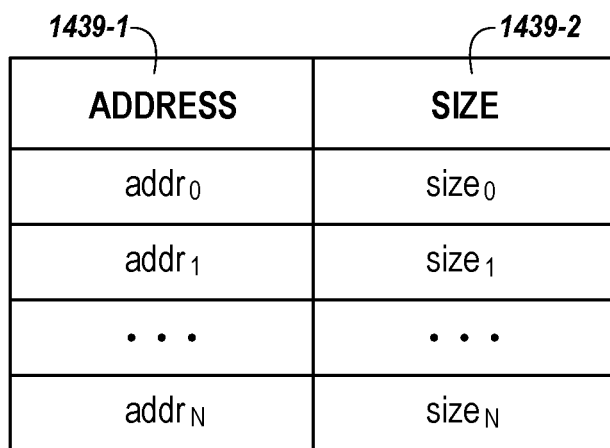
FIG. 14A illustrates an example of a pair of registers used to define a secure memory array in accordance with an embodiment of the present disclosure.
Figure 14B:
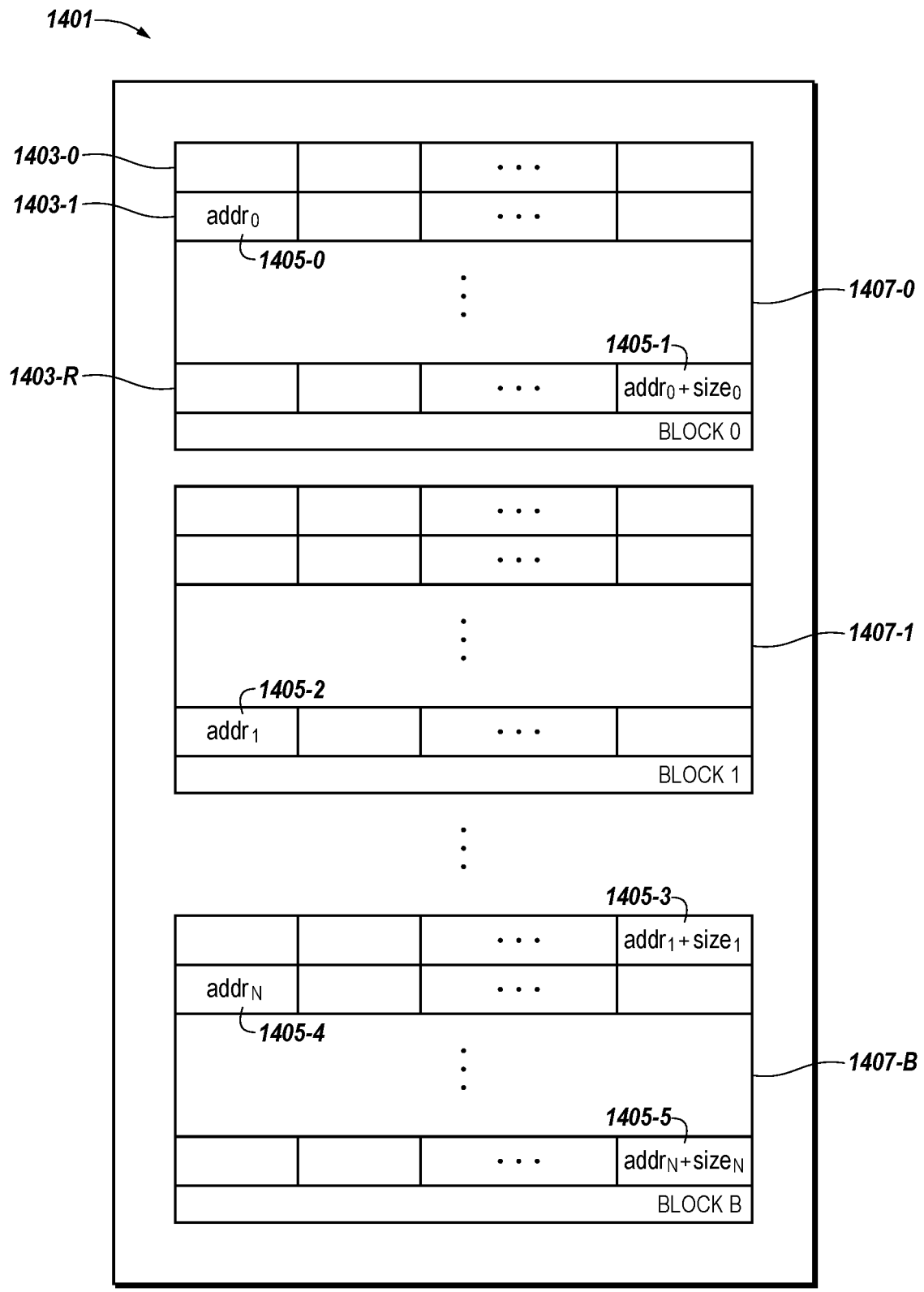
FIG. 14B illustrates a diagram of a portion of a memory array that includes a secure memory array defined in accordance with an embodiment of the present disclosure.

FIG. 14A illustrates an example of a pair of registers 1439-1 and 1439-2 used to define a secure memory array in accordance with an embodiment of the present disclosure, and FIG. 14B illustrates a diagram of a portion of a memory array 1401 that includes a secure memory array defined using registers 1439-1 and 1439-2 in accordance with an embodiment of the present disclosure. Registers 1439-1 and 1439-2 can be, for instance, registers 1139-1 and 1139-2, respectively, previously described in connection with FIG. 11A, and secure memory array 1401 can be, for instance, memory array 1101 previously described in connection with FIG. 11A. For instance, as shown in FIG. 14B, secure memory array 1401 can include a number of physical blocks 1407-0, 1407-1, . . . , 1407-B of memory cells, each including a number of physical rows 1403-0, 1403-1, . . . , 1403-R having a number of sectors of memory cells, in a manner analogous to memory array 1001 previously described in connection with FIG. 10.

As shown in FIG. 14A, register 1439-1 can define addresses of the secure array (e.g., the addresses of different portions of the secure array), and register 1439-2 can define sizes of the secure array (e.g., the sizes of the different portions of the secure array). The addresses of the secure array defined by register 1439-1 can correspond to, for instance, starting points (e.g., starting LBAs) of the secure array (e.g., the starting points of the different portions of the secure array), and the sizes of the secure array defined by register 1439-2 can correspond to, for instance, ending points (e.g., ending LBAs) of the secure array (e.g., the ending points of the different portions of the secure array).

For example, as shown in FIG. 14A, registers 1439-1 and 1439-2 can define N pairs of values, with each respective pair comprising an address value (e.g., addr) defined by register 1439-1 and a size value (e.g., size) defined by register 1439-2. For instance, in the example illustrated in FIG. 14A, $Pair_0$ comprises address value $addr_0$ and size value $size_0$ (e.g., $Pair_0=[addr_0, size_0]$), $Pair_1$ comprises address value $addr_1$ and size value $size_1$ (e.g., $Pair_1=[addr_1, size_1]$), and so on, with $Pair_N$ comprising address value $addr_N$ and size value $size_N$ (e.g., $Pair_N=[addr_N, size_N]$). The address value of a pair can correspond to a starting point (e.g., starting LBA) of a portion of the secure array, and the sum of the address value and the size value of that pair can correspond to the ending point (e.g., ending LBA) of that portion of the secure array. As such, the entire secure array (e.g., the portions that comprise the entire secure array) can be given by: $[addr_0, addr_0+size_0] \cup [addr_1, addr_1+size_1] \cup \ldots \cup [addr_N, addr_N+size_N]$.

The first pair whose size value defined by register 1439-2 is zero can stop the definition of the secure array. For instance, in the example illustrated in FIG. 14A, if the size value of $Pair_2$ zero, then the secure array would be given by: $[addr_0, addr_0+size_0] \cup [addr_1, addr_1+size_1]$.

An example of a secure array defined by registers 1439-1 and 1439-2 (e.g., with all size values defined by register 1439-2 as non-zero) is illustrated in FIG. 14B. For instance, as shown in FIG. 14B, the address (e.g., LBA) associated with sector 1405-0 of memory array 1401 is $addr_0$, the address associated with sector 1405-1 of memory array 1401 is $addr_0+size_0$, the address associated with sector 1405-2 of memory array 1401 is $addr_1$, the address associated with sector 1405-3 of memory array 1401 is $addr_1+size_1$, the address associated with sector 1405-4 of memory array 1401 is $addr_N$, and the address associated with sector 1405-5 of memory array 1401 is $addr_N+size_N$. As such, the secure array comprises sectors (e.g., the data stored in sectors) 1405-0 through 1405-1, sectors 1405-2 through 1405-3, and 1405-4 through 1405-5. However, the sectors of memory array 1401 that are before sector 1405-0, and sectors 1405-1 through 1405-2 of memory array 1401, are not part of the secure array (e.g., the secure array comprises a subset of array 1401).

Figure 15:
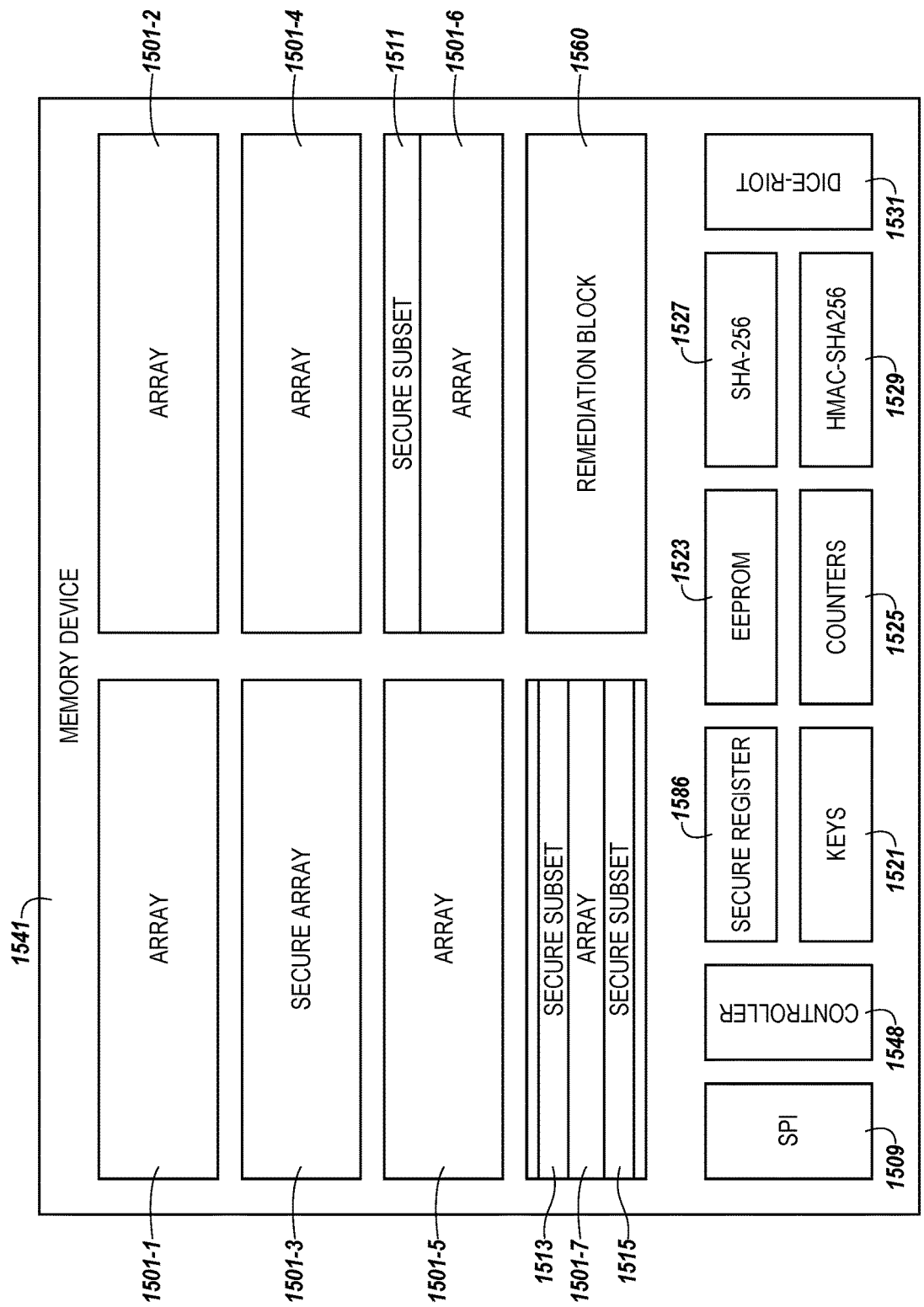
FIG. 15 is a block diagram of an example memory device in accordance with an embodiment of the present disclosure.

FIG. 15 is a block diagram of an example memory device 1541 in accordance with an embodiment of the present disclosure. Memory device 1541 can be, for example, memory device 1141 previously described in connection with FIG. 11A.

As shown in FIG. 15, memory device 1541 can include a number of memory arrays 1501-1 through 1501-7. Memory arrays 1501-1 through 1501-7 can be analogous to memory array 1001 previously described in connection with FIG. 10. Further, in the example illustrated in FIG. 15, memory array 1501-3 is a secure array (sometimes referred to simply as a memory array or an array also), subset 1511 of memory array 1501-6 comprises a secure array, and subsets 1513 and 1515 of memory array 1501-7 comprise a secure array. Subsets 1511, 1513, and 1515 can each include, for instance, 4 kilobytes of data. However, embodiments of the present disclosure are not limited to a particular number or arrangement of memory arrays or secure arrays.

As shown in FIG. 15, memory device 1541 can include a remediation (e.g., recovery) block 1560. Remediation block 1560 can be used as a source of data in case of errors (e.g., mismatches) that may occur during operation of memory device 1541. Remediation block 1560 may be outside of the area of memory device 1541 that is addressable by a host.

As shown in FIG. 15, memory device 1541 can include a serial peripheral interface (SPI) 1509 and a controller 1548. Memory device 1541 can use SPI 1509 and controller 1548 to communicate with a host and memory arrays 1501-1 through 1501-7, as previously described herein (e.g., in connection with FIG. 11A).

As shown in FIG. 15, memory device 1541 can include a secure register 1586 for managing the security of memory device 1541. For example, secure register 1586 can configure, and communicate externally, to an application controller. Further, secure register 1586 may be modifiable by an authentication command.

As shown in FIG. 15, memory device 1541 can include keys 1521. For instance, memory device 1541 can include eight different slots to store keys such as root keys, DICE-RIOT keys, and/or other external session keys.

As shown in FIG. 15, memory device 1541 can include an electronically erasable programmable read-only memory (EEPROM) 1523. EEPROM 1523 can provide a secure non-volatile area available for a host, in which individual bytes of data can be erased and programmed.

As shown in FIG. 15, memory device 1541 can include counters (e.g., monotonic counters) 1525. Counters 1525 can be used as an anti-replay mechanism (e.g., freshness generator) for commands (e.g., to sign a command set or sequence) received from and/or sent to a host. For instance, memory device 1541 can include six different monotonic counters, two of which may be used by memory device 1541 for the authenticated commands, and four of which may be used by the host.

As shown in FIG. 15, memory device 1541 can include an SHA-256 cryptographic hash function 1527, and/or an HMAC-SHA256 cryptographic hash function 1529. SHA-256 and/or HMAC-SHA256 cryptographic hash functions 1527 and 1529 can be used by memory device 1541 to generate cryptographic hashes, such as, for instance, the cryptographic hashes of block 220 previously described herein, and/or a golden hash used to validate the data stored in memory arrays 1501-1 through 1501-7 as previously described herein. Further, memory device 1541 can support L0 and L1 of DICE-RIOT 1531.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
 a processing resource;
 memory having instructions executable by the processing resource; and
 a vehicular communication component coupled to the processing resource, the vehicular communication component configured to:
  verify, in response to receipt of a certificate from a particular vehicle that is registered in a network, an identity of the particular vehicle using the certificate, wherein:
   the network comprises a block chain distributed ledger that is spread over multiple nodes; and
   the certificate is received in response to a departure of the particular vehicle and directly from the particular vehicle when the apparatus is within a particular proximity of the particular vehicle and indirectly via one or more nodes of the network when the apparatus is not within the particular proximity of the particular vehicle; and
  provide, to the particular vehicle and in response to the identity of the particular vehicle being verified, a request for data corresponding to information associated with a route the particular vehicle is to travel along after the departure and a first public key for encryption of the data at the particular vehicle.

2. The apparatus of claim 1, wherein the vehicular communication component is configured to:
 receive a public identification along with the certificate and a second public key that were generated at the particular vehicle; and
 compare, to verify the identity of the particular vehicle, the second public key to an output of a decryption component, wherein the vehicle public identification, the vehicle certificate, and the second public key are input into the decryption component.

3. The apparatus of claim 2, wherein the decryption component comprises a first decryptor and a second decryptor, and wherein the vehicular communication component is configured to:

input the second public key and the vehicle certificate into the first decryptor;

input the second public key and an output of the first decryptor into the second decryptor; and compare an output of the second decryptor to the second public key, wherein the identity of the particular vehicle is verified when the output of the second decryptor equals to the second public key.

4. The apparatus of claim 1, wherein the vehicular communication component is configured to discard, in response to the identity of the particular vehicle not being verified, the data.

5. The apparatus of claim 1, wherein the vehicular communication component being configured to request the data comprises the vehicular communication component being configured to:

provide, to the particular vehicle, a message indicating that the identity of the particular vehicle is verified;

wherein the data are received in response to providing the message.

6. The apparatus of claim 1, wherein the vehicular communication component is configured to receive the certificate from at least one of:

the particular vehicle; and a network having the certificate.

7. The apparatus of claim 1, wherein the information comprises at least one of:

a location of a destination;

an expected travel time to the destination; and a distance to the destination.

8. The apparatus of claim 1, wherein the particular vehicle is an emergency vehicle.

9. A method, comprising:

generating, at a first vehicle that is registered in a network, a certificate based at least in part on a public key that is also generated at the first vehicle;

providing, in response to a departure of the first vehicle and to a second vehicle, the certificate and the public key directly when the second vehicle is within a particular proximity of the first vehicle and indirectly via one or more nodes of the network when the second vehicle is not within the particular proximity of the first vehicle, wherein the network comprises a block chain distributed ledger that is spread over multiple nodes; and providing, to the second vehicle and in response to an identity of the first vehicle being verified at the second vehicle, data corresponding to information associated with a route the first vehicle is to travel along after the departure.

10. The method of claim 9, wherein a public identification of the first vehicle is provided, along with the certificate and the public key, to the second vehicle, and the method further comprises:

generating the certificate further based on a device secret of the first vehicle and a number generated at a number generator of the first vehicle.

11. The method of claim 10, further comprising generating the public identification based on the device secret.

12. The method of claim 10, further comprising generating the public key based on the number generated at the number generator of the first vehicle.

13. The method of claim 9, wherein the information associated with the route comprises at least one of:

a vehicle identification number (VIN); and a license plate combination.

14. The method of claim 9, wherein the public key generated at the first vehicle is a first public key, and the method further comprises:

receiving, in response to the identity of the first vehicle being verified, a second public key from the second vehicle;

encrypting the data to be sent to the second vehicle using the second public key;

the encrypted data are decrypted at the second vehicle using a private key generated, at the second vehicle, along with the second public key.

15. The method of claim 9, further comprising:

receiving a message from the second vehicle, wherein the message indicates that the identity of the first vehicle is verified;

providing, in response to receiving the message, the data to the second vehicle.

16. The method of claim 15, wherein the message includes an anti-replay portion and the method further comprises ensuring, by validating the message including the anti-replay portion, the message has not been previously executed on the first vehicle.

17. A system, comprising:

a first vehicle of a network and configured to generate a certificate associated with an identity of the first vehicle and a first public key, wherein the network comprises a block chain distributed ledger that is spread over multiple nodes; and a second vehicle of the network and configured to:

receive, in response to a departure of the first vehicle, the certificate directly from the first vehicle when the second vehicle is within a particular proximity of the first vehicle and indirectly from the first vehicle via one or more nodes of the network when the second vehicle is not within the particular proximity of the first vehicle;

verify the identity of the first vehicle based on a comparison between the certificate and the first public key; and provide, to the first vehicle and in response to the identity of the first vehicle being verified, a request for data corresponding to information associated with a route the first vehicle is to travel along after the departure and a second public key for encryption of the data at the first vehicle.

18. The system of claim 17, wherein the first vehicle is configured to broadcast the first public key such that the first vehicle is configured to provide, when the second vehicle is within the particular proximity to the first vehicle, the first public key directly to the second vehicle.

19. The system of claim 17, wherein the system comprises an intermediary device configured to:

retrieve, in response to the departure of the first vehicle, the first public key from a network; and provide, to the second vehicle, the first public key.

20. The system of claim 19, wherein the second vehicle is within the particular proximity to the intermediary device such that the second vehicle is communicable with the intermediary device via a device-to-device (D2D) communication.

21. The system of claim 17, wherein the first vehicle is configured to generate a public identification along with the certificate and the first public key such that the public identification and the public key, along with the certificate, are provided to the second vehicle in response to the departure of the first vehicle.

22. The system of claim 21, wherein the first vehicle comprises an asymmetric identification generator, and wherein the first vehicle is configured to generate a private identification along with the public identification using the asymmetric identification generator.

23. The system of claim 17, wherein the first vehicle comprises an asymmetric key generator, and wherein the first vehicle is configured to generate a private key along with the first public key using the asymmetric key generator.

24. The system of claim 17, wherein the second vehicle is an autonomous vehicle.

25. The system of claim 17, wherein the first vehicle is an emergency vehicle, and wherein the information comprises at least one of:
   a type of the emergency vehicle;
   the route to a destination of the emergency vehicle; and
   a type of emergency.

* * * * *